United States Patent
Delahunt et al.

(10) Patent No.: US 8,348,671 B2
(45) Date of Patent: Jan. 8, 2013

(54) VISUAL DIVIDED ATTENTION TRAINING

(75) Inventors: Peter B Delahunt, San Mateo, CA (US);
Karlene Ball, Hoover, AL (US); Donald F Brenner, San Francisco, CA (US);
Joseph L. Hardy, Richmond, CA (US);
Henry W. Mahncke, San Francisco, CA (US); Daniel L. Roenker, Lexington, KY (US)

(73) Assignee: Posit Science Corporation, San Francisco, CA (US)

( * ) Notice: Subject to any disclaimer, the term of this patent is extended or adjusted under 35 U.S.C. 154(b) by 1115 days.

(21) Appl. No.: 12/254,180

(22) Filed: Oct. 20, 2008

(65) Prior Publication Data
US 2010/0041001 A1    Feb. 18, 2010

Related U.S. Application Data

(60) Provisional application No. 61/089,672, filed on Aug. 18, 2008.

(51) Int. Cl.
*G09B 19/00* (2006.01)

(52) U.S. Cl. .................................. 434/236; 434/322

(58) Field of Classification Search .................. 434/236, 434/322–365, 169–185, 258; 600/544–545; 709/213; 351/203, 246
See application file for complete search history.

(56) References Cited

U.S. PATENT DOCUMENTS 6,364,486 B1 * 4/2002 Ball et al. ............... 351/203
2007/0166676 A1 * 7/2007 Bird et al. ............... 434/236

* cited by examiner

*Primary Examiner* — Timothy A Musselman
(74) *Attorney, Agent, or Firm* — James W. Huffman

(57) ABSTRACT

Computer-implemented method for enhancing cognition of a participant. A first target image of a set of target images is visually presented for a specified presentation time at a first location in a visual field that includes multiple peripheral locations, each at least a specified distance from the first location. Substantially simultaneously, a first peripheral location in the visual field is visually indicated for the presentation time, after which the visually presenting and indicating are ceased. Candidate target images with a specified discriminability are visually presented, including the first target image. The participant is required to select the target image from among the candidates. If the participant correctly selected the first target image, the participant is required to select the first peripheral location from the multiple peripheral locations. The presentation time is adaptively modified based on the correctness/incorrectness of the participant's selections. The process is repeated to improve the participant's cognition.

26 Claims, 14 Drawing Sheets

| Set Number | Target A | Target B | Target A Name | Target B Name |
|---|---|---|---|---|
| 1 |  |  | 65_car_ford_2D_CT_021 | 65_truck_ford_002 |
| 2 |  |  | 65_car_ford_2D_CT_020 | 65_car_ford_2D_CT_021 |
| 3 |  |  | 65_truck_chevy_020 | 65_truck_chevy_021 |
| 4 |  |  | 65_truck_ford_020 | 65_truck_ford_002 |
| 5 |  |  | 65_truck_chevy_021 | 65_car_mg_CT_020 |
| 6 |  |  | 65_car_chevy_SD_HT_020 | 65_car_ford_2D_CT_020 |
| 7 |  |  | 65_car_chevy_2D_CT_020 | 65_car_ford_2D_CT_021 |
| 8 |  |  | 65_car_at_CT_020 | 65_truck_ford_021 |
| 9 |  |  | 65_car_chevy_2D_CT_020 | 65_car_chevy_2D_HT_020 |

| Set Number | Target | Distractor | Discriminability | Emphasis Level |
|---|---|---|---|---|
| 1 | ROUTE 66 | XING (rabbit) | Easy | 1 - Desert |
| 2 | ROUTE 66 | XING (horse rider) | Easy | 2 - Countryside |
| 3 | ROUTE 66 | XING (pedestrian) | Easy | 3 - City |

FIG. 15

VISUAL DIVIDED ATTENTION TRAINING

CROSS REFERENCE TO RELATED APPLICATION(S)

This application incorporates herein in their entirety for all purposes:

| Docket No. | Ser. No. | Filing Date: | Title: |
|---|---|---|---|
| PS.0140-01 | 61/089,672 | Aug. 18, 2008 | ENHANCEMENTS AND EXTENSIONS OF USEFUL FIELD OF VIEW TRAINING: THE POSIT SCIENCE VERSION |

The following applications are related to the present application, and are hereby incorporated by reference in their entirety for all purposes:

| PS.0218 | ******* | ******* | COGNITIVE TRAINING USING VISUAL SEARCHES |
|---|---|---|---|
| PS.0219 | ******* | ******* | COGNITIVE TRAINING USING MULTIPLE OBJECT TRACKING |
| PS.0229 | ******* | ******* | COGNITIVE TRAINING USING VISUAL STIMULI |
| PS.0230 | ******* | ******* | VISUAL EMPHASIS FOR COGNITIVE TRAINING |

FIELD OF THE INVENTION

This invention relates in general to the use of brain health programs utilizing brain plasticity to enhance human performance and correct neurological disorders, and more specifically, to a method for improving a participant's cognition, and more specifically, for improving a participant's visual divided attention.

BACKGROUND OF THE INVENTION

As we get older, our ability to accurately and rapidly extract information from the visual periphery is degraded, particularly under attentionally demanding conditions. This ability to efficiently process peripheral visual information, particularly under conditions of divided attention is referred to as the Useful Field of View (UFOV). Reduced UFOV performance in older adults is associated with poorer driving performance and more auto accidents. In addition to the relation between driving difficulty and reduced UFOV, the loss of efficient visual processing can result in myriad other functional deficits, including reduced activity levels (Roth, et al, 2003), reduced ability to perform activities of daily living and increased likelihood of falls. It has been shown that the UFOV can be expanded and the speed of visual information processing can be accelerated at any age with the appropriate training. The positive consequences of this UFOV training-induced performance improvement include improved health-related quality of life outcomes and improved ability to perform activities of daily living years after the training period.

Prior art programs for improving older adults' UFOV have been developed; however, these training programs are performed with the help of a facilitator, making them somewhat inconvenient and generally expensive, and generally have significantly limited functionality, particularly with regard to dynamic adaptivity and complexity.

Thus, improved systems and methods for improving visual divided attention of a participant are desired.

SUMMARY

Various embodiments of a system and method for improving a participant's visual divided attention are presented.

A set of target images may be provided, where the target images are available for visual presentation to the participant. Note that the target images may be of any type desired. For example, in various embodiments, the target images may be of vehicles, letters, words, numbers, shapes, patterns, etc., as desired.

A first target image of the set of target images may be visually presented at a first location in a visual field to the participant. The visual field preferably includes a plurality of peripheral locations, each located at least a specified distance from the first location. For example, in one embodiment, and first target image may be presented in the center of the visual field, referred to as the "fixation point", and the peripheral locations may include specific locations around the first target image and separated from the first target image by some specified distance or radius. This distance or radius may be specified to have any of various values, ranging from some minimum, where the perimeter locations are not far from the first target image, to some maximum value, e.g., around the perimeter of the visual field. This distance may be referred to as eccentricity, and may be adjusted during performance of the method, as will be described below in more detail. In other embodiments, eccentricity may refer to an angular subtense between the participant's view vector (or axis) to the first target and that to the first peripheral location, e.g., based on some standard or typical viewing distance, e.g., 2-2.5 feet, and the screen size/resolution of the computer monitor being used.

A first peripheral location of the plurality of peripheral locations in the visual field may be visually indicated to the participant. In some embodiments, the first peripheral location may be visually indicated with an image, i.e., a peripheral image may be visually presented at the first peripheral location. The peripheral location image or indicator may be referred to as the peripheral target. Thus, in some embodiments, the method may include providing one or more peripheral target images, where the peripheral target images are available for visual presentation to the participant, and said visually indicating a first peripheral location includes visually presenting a peripheral target image at the first peripheral location. Moreover, in some embodiments, the method may further include providing one or more backgrounds, where the one or more backgrounds are available for visual presentation to the participant. Visually indicating the first peripheral location may thus include visually presenting a peripheral target image at the first peripheral location, where the visual field includes a first background of the one or more backgrounds, and where each background has a specified distinguishability comprising the degree to which the peripheral target images are distinguishable from the background.

In one embodiment, visually presenting the first target image and visually indicating the first peripheral location may be performed substantially simultaneously and for a specified presentation time, where at the end of the specified presentation time the visually presenting the first target image and visually indicating the first peripheral location may be ceased. In other words, the first target image and the first peripheral location may be visually presented/indicated to the participant at either the same time (e.g., and for the same duration), or within some small time interval of each other. For example, in one embodiment, the visually presenting the first target image and the visually indicating the first peripheral location may be from within a few milliseconds to within 0.5 seconds of each other, and in different embodiments, may be performed in either order, e.g., the visually presenting the first target image and/or the visually indicating the first peripheral location may be initiated first. In some embodiments, the (initiation of the) visually presenting the first target image and/or the visually indicating the first peripheral location may be performed within some specified time interval, e.g., within ~20% of the presentation/indication duration. In one embodiment, the visually presenting the first target image and the visually indicating the first peripheral location may be ceased at the same time, although in another embodiment they may be ceased at slightly different times, e.g., corresponding to the difference in time of their initiation.

Two or more candidate target images may then be visually presented to the participant, including the first target image and at least one other target image of the set of target images. The two or more candidate target images may have a specified discriminability, comprising a degree to which the candidate target images visually differ. The visual discriminability of images, and the distinguishability of images against a background, or more generally, of visual stimuli, may be referred to as visual emphasis.

The participant may be required to select the target image from among the candidate target images. In other words, the participant may be presented with a plurality of candidate target images which includes the first target image (308), and the participant may be required to indicate which of the candidate target images is the first target image. The participant a may indicate the first target image in any of a variety of ways. For example, in preferred embodiments the participant may simply click on the selected image using a mouse, i.e., placing a cursor over the location and pressing a mouse button. More generally, in some embodiments, selection of an image or location may be performed by the participant placing a cursor over (or in) a region that contains the image or a location and clicking the mouse.

A determination may be made as to whether the participant correctly selected the first target image, and if the participant correctly selected the first target image, the participant may be required to select the first peripheral location from among the plurality of peripheral locations in the visual field. Said another way, in some embodiments, the participant may not proceed to the peripheral location aspect of the task unless success is achieved with respect to the target identification aspect of the task. Thus, for example, in one embodiment, if the participant fails to correctly identify the first target image, the method may return to 304 and continued with another target image. In another embodiment, and the method may re-present the first target image, possibly with different other candidate target images, for identification or selection by participant.

In some embodiments where the peripheral location is indicated with a peripheral target image, the participant may be required to identify the peripheral target image. In other words, rather than simply indicating the peripheral location (detection), the participant may be required to identify the peripheral target image as well, e.g., by selecting it from a set of presented candidate peripheral target images.

A determination may be made as to whether the participant correctly selected the first peripheral location. For example, the method may determine if the user correctly clicked with the mouse on the first peripheral location. In embodiments where the first peripheral location is indicated with an image, the method may determine whether the participant clicked on the (peripheral) image.

In some embodiments, whether the participant correctly selected the first target image (or not) and/or whether the participant correctly selected the first peripheral location may be recorded. In some embodiments, an indication, e.g., a graphical or audible indication, may be provided to the participant indicating the correctness or incorrectness of the participant's response, i.e., indicating whether the participant selected the target image correctly, and indicating whether the participant selected the first peripheral location correctly. For example, a "ding" or a "thunk" may be played to indicate correctness or incorrectness, respectively, and/or points may be awarded (in the case of a correct response). Of course, any other type of indication may be used as desired.

The presentation time may be adaptively modified based on the participant's selections. In other words, based on how the user responds, the method may modify the presentation time, e.g., decreasing the presentation time to make the exercise more difficult, or increasing the presentation time to make the exercise less difficult. Further details regarding adaptive modification of the presentation time (and possibly other attributes), as well as progressive modification of various other parameters of the exercise are provided below.

The visually presenting a first target image, visually indicating, visually presenting two or more candidate target images, requiring the participant to select the target image, and determining whether the participant correctly selected the first target image, requiring the participant to select the first peripheral location, determining whether the participant correctly selected the first peripheral location, and adaptively modifying the presentation time, may be repeated one or more times in an iterative manner to improve the participant's cognition. In some embodiments, after each trial, user input invoking initiation of a next trial may be received. For example, the participant may click on a "start", "next", or "continue" button (or functional equivalent) with a mouse to initiate the next trial.

The above visually presenting a first target image, visually indicating, visually presenting two or more candidate target images, requiring the participant to select the target image, and determining whether the participant correctly selected the first target image, requiring the participant to select the first peripheral location, determining whether the participant correctly selected the first peripheral location, and adaptively modifying the presentation time may compose a trial in the exercise. In the case of an incorrect response regarding the selection of the first target image, a trial may be limited to the visually presenting a first target image, visually indicating, visually presenting two or more candidate target images, requiring the participant to select the target image, and determining whether the participant correctly selected the first target image, since an incorrect response may prevent progressing to the next portion of the trial-the selection of the first peripheral location.

Thus, various embodiments of the systems and methods disclosed herein may be used to enhance cognition of the participant.

BRIEF DESCRIPTION OF THE DRAWINGS

FIG. 15 illustrates an exemplary collection of peripheral target images and distracter images, according to one embodiment;

DETAILED DESCRIPTION

Figure 1:
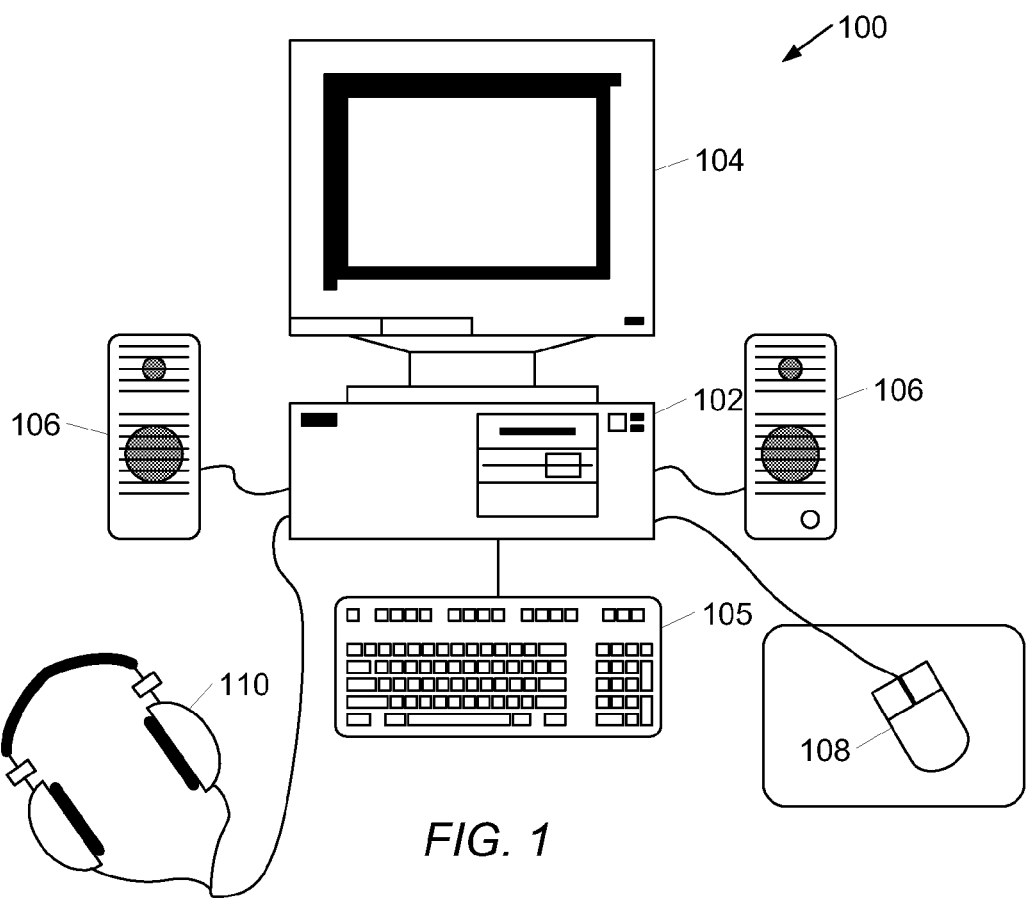
FIG. 1 is a block diagram of a computer system for executing a program according to some embodiments of the present invention.

Referring to FIG. 1, a computer system 100 is shown for executing a computer program to train, or retrain an individual according to the present invention to enhance cognition, where the term "cognition" refers to the speed, accuracy and reliability of processing of information, and attention and/or memory, and where the term "attention" refers to the facilitation of a target and/or suppression of a non-target over a given spatial extent, object-specific area or time window. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, and headphones 110. In some embodiments, the speakers 106 and the headphones 110 may provide auditory prompting and feedback to the subject during execution of the computer program. The mouse 108 allows the subject to navigate through the computer program, and to select particular responses after visual or auditory prompting by the computer program. The keyboard 105 allows an instructor to enter alphanumeric information about the subject into the computer 102, and/or allows the subject to interact with the computer program. Although a number of different computer platforms are applicable to the present invention, embodiments of the present invention execute on either IBM compatible computers or Macintosh computers, or similarly configured computing devices such as set top boxes, PDA's, gaming consoles, etc.

Figure 2:
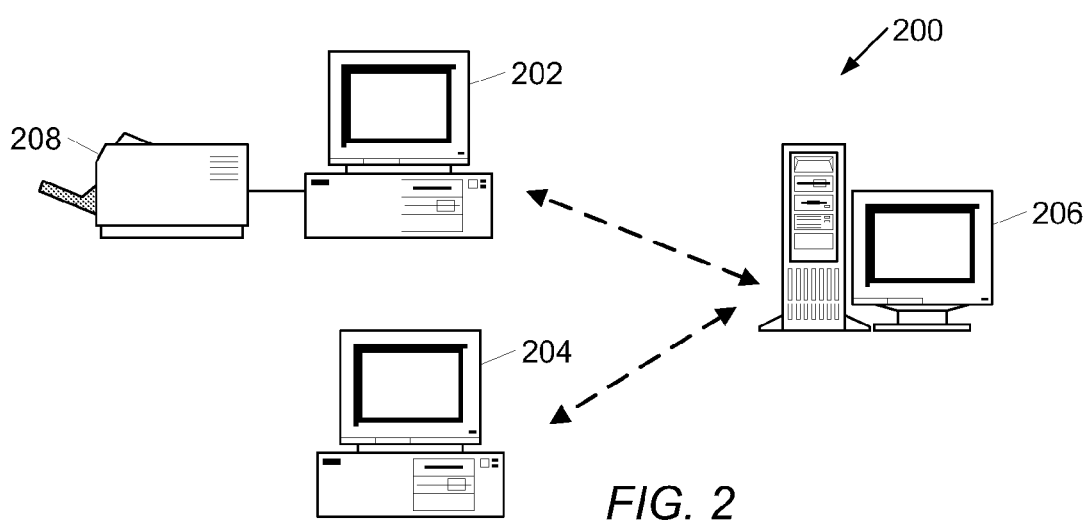
FIG. 2 is a block diagram of a computer network for executing a program according to some embodiments of the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows information such as test scores, game statistics, and other subject information to flow from a subject's computer 202, 204 to a server 206. An administrator can review the information and can then download configuration and control information pertaining to a particular subject, back to the subject's computer 202, 204. Alternatively, or additionally, the server 206 may execute the computer program, and the subject may interact with the program via the subject's computer, e.g., in a client/server relationship.

Embodiments of the computer-based exercises and tasks described herein may operate to renormalize and improve the participant's cognition, e.g., the ability of the visual nervous system of a participant to search for objects in a visual scene, and the efficiency and capacity of visual attentional processing. In embodiments of the present invention, a target object may be presented for identification by the user, and a peripheral location (e.g., a peripheral target at the peripheral location) indicated, possibly with one or more distracters (other objects) cluttering the view field. If the user correctly identifies the target, the user may be required to select or otherwise indicate the peripheral location. The training described herein may require divided attention and may utilize a reward structure to stimulate neuromodulatory brain processes to enhance cognition in a participant, e.g., an aging adult.

Visual Divided Attention Game

Other enhancements to the visual training program described in this document include the addition of engaging game elements that are integrated with the core training task. These game elements confer substantial benefits to the user or the training program. For one, the game context may encourage the user to engage more attentional resources to task, which can be critical for promoting brain change, as the release of cortical acetylcholine associated with intense attentional focus is a critical gating factor for brain plasticity. Additionally, as described below, successful performance on the game depends on successful performance on the training task.

When a user becomes involved and invested in performing well on an engaging game, the user is highly rewarded for making a correct response on the training task. Thus, more dopamine is released in the user's brain upon making a correct response. This dopamine release is another crucial factor for encouraging brain plasticity. Finally, the interest and goal orientation created by the game context provides incentive to continue training for longer periods of time than would generally be supported by the less engaging training task on its own.

Below are described various embodiments of a cognitive training exercise that utilizes visual divided attention training to improve cognition, e.g., to reverse declines in visual attention and search by incorporating distracters, as well as features to stimulate brain neuromodulatory systems to enhance cognition, e.g., to optimize learning in a participant, e.g., an aging adult. More specifically, embodiments of the exercise may improve the efficiency, capacity and effective spatial extent of divided visual attentional processing, by training participants to detect and/or identify multiple targets among distracters. Moreover, as described below, in some embodiments, stimulus threshold assessments may also be performed in conjunction with, or as part of, the exercise, thus facilitating more effective training of the participant's visual processing system.

Figure 3:
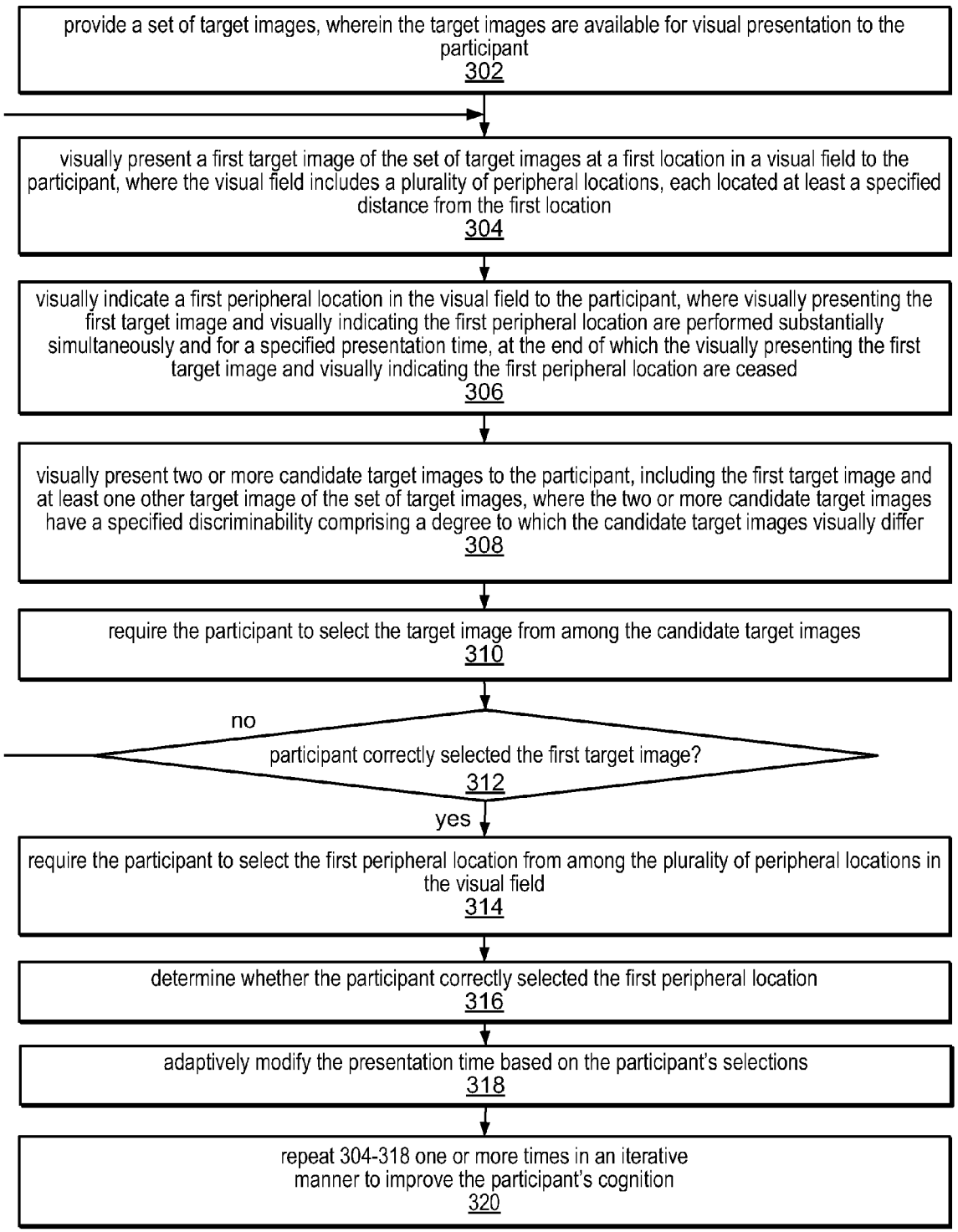
FIG. 3 is a high-level flowchart of one embodiment of a method for cognitive training using visual divided attention training, according to one embodiment.

FIG. 3—Flowchart of a Method for Enhancing Cognition Using Visual Divided Attention Training FIG. 3 is a high-level flowchart of one embodiment of a method for enhancing cognition using visual divided attention training. More specifically, the method utilizes a computing device to present a target image and a peripheral location, possibly with distracters, which the participant is expected to identify, and to record responses from the participant. It should be noted that in various embodiments, some of the method elements may be performed concurrently, in a different order than shown, or may be omitted. Additional method elements may also be performed as desired. As shown, the method may be performed as follows:

In 302, a set of target images may be provided, where the target images are available for visual presentation to the participant. Note that the target images may be of any type desired. For example, in various embodiments, the target images may be of vehicles, letters, words, numbers, shapes, patterns, etc., as desired.

In 304, a first target image of the set of target images may be visually presented at a first location in a visual field to the participant. The visual field preferably includes a plurality of peripheral locations, each located at least a specified distance from the first location. For example, in one embodiment, and first target image may be presented in the center of the visual field, referred to as the "fixation point", and the peripheral locations may include specific locations around the first target image and separated from the first target image by some specified distance or radius. This distance or radius may be specified to have any of various values, ranging from some minimum, where the perimeter locations are not far from the first target image, to some maximum value, e.g., around the perimeter of the visual field. This distance may be referred to as eccentricity, and may be adjusted during performance of the method, as will be described below in more detail. In other embodiments, eccentricity may refer to an angular subtense between the participant's view vector (or axis) to the first target and that to the first peripheral location, e.g., based on some standard or typical viewing distance, e.g., 2-2.5 feet, and the screen size/resolution of the computer monitor being used.

In one embodiment, the visual field may be partitioned into a plurality of graphically indicated regions, where the plurality of peripheral locations include specified regions of the plurality of regions in the visual field. In other words, each peripheral location may define or represent a respective geometric region or partition of the visual field.

Graphical User Interface

In some embodiments, the participant may perform the exercise or tasks via a graphical user interface (GUI), whereby images and/or sounds are presented to the participant, and whereby the participant may provide responses. For example, in one embodiment, the GUI may include the visual field within which various images, e.g., target images, and locations, e.g., peripheral locations, may be displayed to the participant, as well as various on-screen buttons or controls whereby the user may interact with the method or exercise; see, e.g., the exemplary visual fields of FIGS. 4A-4C, 8A-8C, 9A-9B, 10A-10B, 11A-11C, and 16A-16C, described in detail below. Moreover, in some embodiments, additional GUI elements may be provided, e.g., for indicating various aspects of the participant's progress or status with respect to the exercise or task.

Figure 4A:
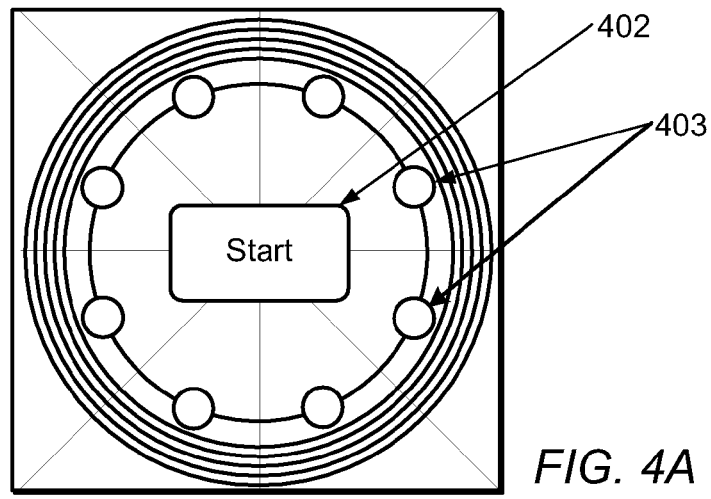
FIGS. 4A-4C illustrate exemplary wireframe layouts for a visual divided attention task, according to one embodiment.
Figure 4B:
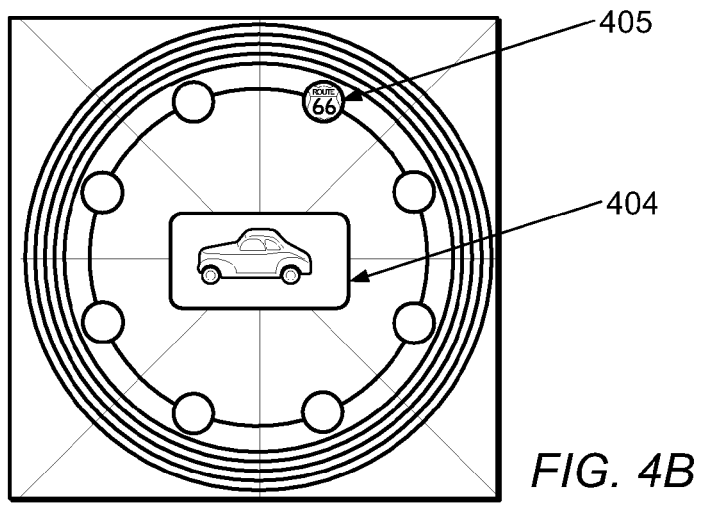
Figure 5A:
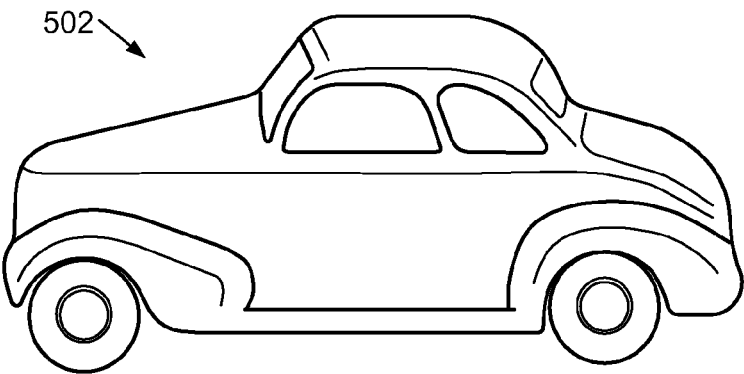
FIGS. 5A and 5B illustrate exemplary target images, according to one embodiment.

FIG. 4A illustrates an exemplary GUI that includes a start button whereby the participant may initiate the exercise or a portion, e.g., a trial, of the exercise. Thus, the participant may press (e.g., click on) the start button to begin. Note that the exemplary GUI of FIG. 4A also includes the plurality of peripheral locations 403 arranged in a circle around the center of the visual field, i.e., the fixation point (here obscured by the start button). FIG. 4B illustrates one embodiment of the visual presentation of the first target image 404 in the GUI of FIG. 4A. In this example, the first target image is of an older model automobile, specifically, an old Ford 2-door convertible top model. A magnified version of the exemplary first target image of FIG. 4B is presented in FIG. 5A. Note that the target image shown in FIG. 4B and FIG. 5A is a simple line drawing, and that in some embodiments, the target image(s) may be more complex, e.g., colored and/or shaded, images.

In various embodiments, the GUI may also include additional indicators, such as, for example, a bonus meter (or equivalent), which may indicate the number of correct responses in a row, and may flash, play music, and/or award bonus points, when some specified number, e.g., 5, in a row is attained. It should be noted that the GUIs described herein are meant to be exemplary only, and that other GUIs are envisioned. Various other embodiments and aspects of exemplary GUIs are described in more detail below.

In 306, a first peripheral location of the plurality of peripheral locations in the visual field may be visually indicated to the participant. In some embodiments, the first peripheral location may be visually indicated with an image, i.e., a peripheral image may be visually presented at the first peripheral location. The peripheral location image or indicator may be referred to as the peripheral target. Thus, in some embodiments, the method may include providing one or more peripheral target images, where the peripheral target images are available for visual presentation to the participant, and said visually indicating a first peripheral location includes visually presenting a peripheral target image at the first peripheral location. Moreover, in some embodiments, the method may further include providing one or more backgrounds, where the one or more backgrounds are available for visual presentation to the participant. Visually indicating the first peripheral location may thus include visually presenting a peripheral target image at the first peripheral location, where the visual field includes a first background of the one or more backgrounds, and where each background has a specified distinguishability comprising the degree to which the peripheral target images are distinguishable from the background.

Figure 6A:
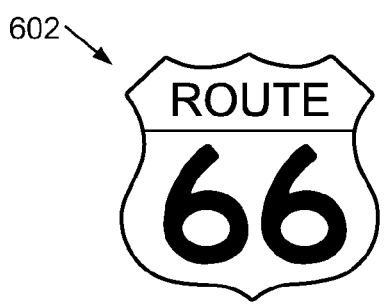
FIGS. 6A and 6B respectively illustrate an exemplary peripheral location image and a distracter image, according to one embodiment.

FIG. 4B also illustrates indication of the first peripheral location 405 via an image, in this exemplary example, a "Route 66" symbol, although it should be noted that any other types of indicators or images may be used as desired, and may be referred to as peripheral stimuli. FIG. 6A presents a magnified version of the Route 66 symbol of FIG. 4B. As noted above with respect to the exemplary first target image, in some embodiments, the peripheral location image(s) may be more complex, e.g., colored and/or shaded, images.

In one embodiment, visually presenting the first target image (304) and visually indicating the first peripheral location (306) may be performed substantially simultaneously and for a specified presentation time, where at the end of the specified presentation time the visually presenting the first target image and visually indicating the first peripheral location may be ceased. In other words, the first target image and the first peripheral location may be visually presented/indicated to the participant at either the same time (e.g., and for the same duration), or within some small time interval of each other. For example, in one embodiment, the visually presenting the first target image and the visually indicating the first peripheral location may be from within a few milliseconds to within 0.5 seconds of each other, and in different embodiments, may be performed in either order, e.g., the visually presenting the first target image and/or the visually indicating the first peripheral location may be initiated first. In some embodiments, the (initiation of the) visually presenting the first target image and/or the visually indicating the first peripheral location may be performed within some specified time interval, e.g., within ~20% of the presentation/indication duration. In one embodiment, the visually presenting the first target image and the visually indicating the first peripheral location may be ceased at the same time, although in another embodiment they may be ceased at slightly different times, e.g., corresponding to the difference in time of their initiation.

There are various ways in which the visually presenting the first target image and the visually indicating the first peripheral location may be ceased. For example, in one embodiment the first target image in the visual indication of the first peripheral location may simply be removed from the visual field. In another embodiment, masks may be employed to hide or cover up the first target image and the indication of the first peripheral location, e.g., the peripheral image. In other words, after the stimulus presentation, the central stimulus (target image) and/or all possible locations of the peripheral stimulus may be replaced with a mask for a period of time.

Figure 7A:
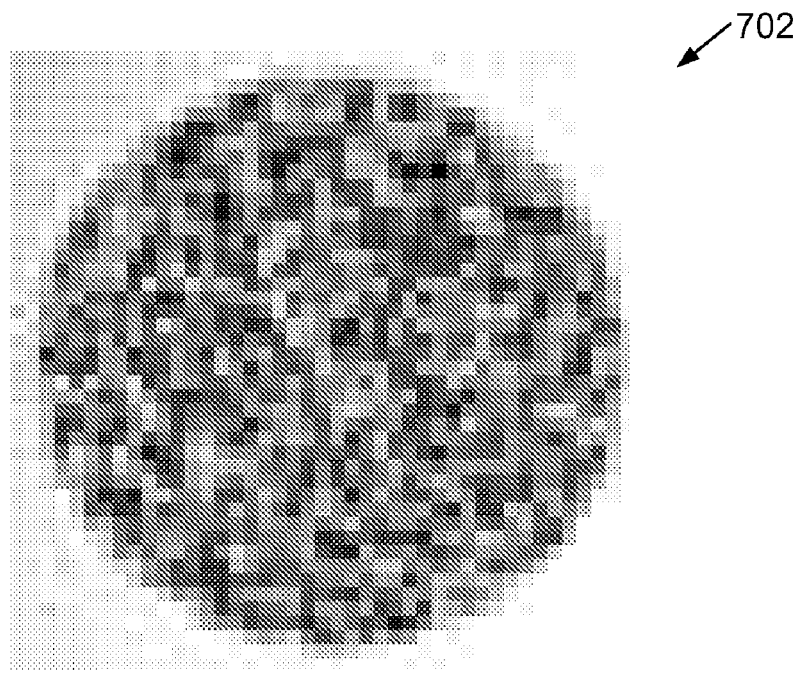
FIG. 7A illustrates an exemplary mask, according to one embodiment.

FIG. 7A illustrates an exemplary mask 702 that in some embodiments may be used to mask the peripheral locations (and possibly the target image) to implement ceasing of the visual indication of the first peripheral location. In other words, the mask 702 may be displayed in each of the peripheral locations 403 (see, e.g., the (circular) peripheral locations of FIGS. 4A-4C) of the visual field so as to obscure the visual indication of the first peripheral location. Of course, in other embodiments, other masks or means of ceasing may be used as desired.

Thus, the visually presenting the first target image and visually indicating the first peripheral location may be ceased by removing the first target image and the indication of the first peripheral location from the visual field, and/or masking the first target image and the indication of the first peripheral location in the visual field.

In 308, two or more candidate target images may be visually presented to the participant, including the first target image and at least one other target image of the set of target images. The two or more candidate target images may have a specified discriminability, comprising a degree to which the candidate target images visually differ. The visual discriminability of images, and the distinguishability of images against a background, or more generally, of visual stimuli, may be referred to as visual emphasis.

Figure 4C:
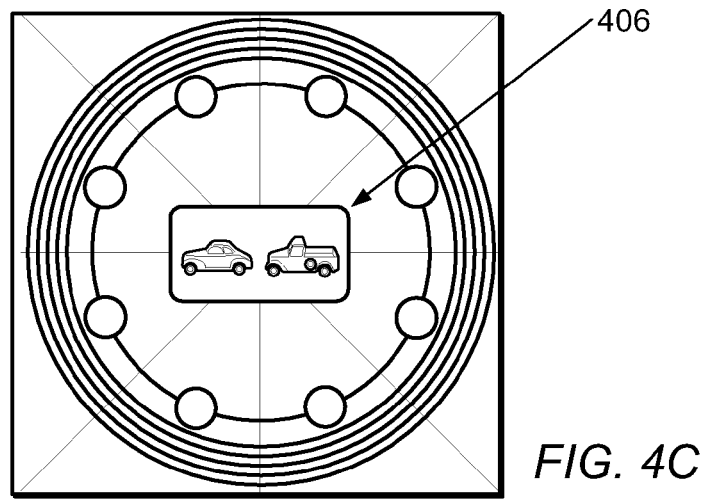
Figure 5B:
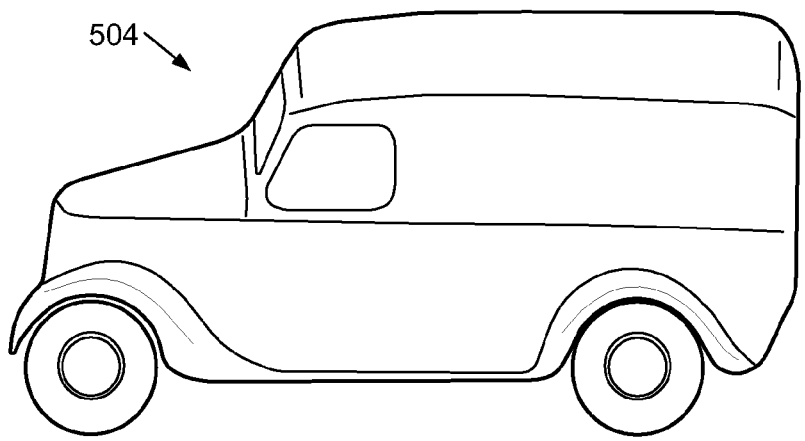

FIG. 4C illustrates the GUI and visual field of FIGS. 4A and 4B, but where two exemplary candidate target images 406 are displayed in the center of the visual field. Note that in this example, the originally displayed first target image, an old model Ford 2-Door automobile, is presented with an image of an old Ford truck. Another exemplary candidate target image is shown in FIG. 5B, in this case, another old model Ford truck.

In 310, the participant may be required to select the target image from among the candidate target images. In other words, the participant may be presented with a plurality of candidate target images which includes the first target image (308), and the participant may be required to indicate which of the candidate target images is the first target image. The participant a may indicate the first target image in any of a variety of ways. For example, in preferred embodiments the participant may simply click on the selected image using a mouse, i.e., placing a cursor over the location and pressing a mouse button. More generally, in some embodiments, selection of an image or location may be performed by the participant placing a cursor over (or in) a region that contains the image or a location and clicking the mouse.

In other embodiments, the participant may indicate the image via a computer keyboard, e.g., using arrow keys, and so forth, as desired. For example, in some exemplary embodiments, the up-arrow may be used to initiate the trial, the left- and right-arrows may be used to select between two candidate images, e.g., a car or truck on the left and right respectively, and/or the left- and right-arrows may be used to click through all of the response options, e.g., to navigate through the possible responses, and the down-arrow may be used to select an option.

In 312, a determination may be made as to whether the participant correctly selected the first target image, and if the participant correctly selected the first target image, the participant may be required to select the first peripheral location from among the plurality of peripheral locations in the visual field, as indicated in 314.

Said another way, in some embodiments, the participant may not proceed to the peripheral location aspect of the task unless success is achieved with respect to the target identification aspect of the task. Thus, for example, in one embodiment, if the participant fails to correctly identify the first target image, the method may return to 304 and continued with another target image. In another embodiment, and the method may re-present the first target image, possibly with different other candidate target images, for identification or selection by participant.

In some embodiments where the peripheral location is indicated with a peripheral target image, the participant may be required to identify the peripheral target image. In other words, rather than simply indicating the peripheral location (detection), the participant may be required to identify the peripheral target image as well, e.g., by selecting it from a set of presented candidate peripheral target images.

In 316, a determination may be made as to whether the participant correctly selected the first peripheral location. For example, the method may determine if the user correctly clicked with the mouse on the first peripheral location. In embodiments where the first peripheral location is indicated with an image, the method may determine whether the participant clicked on the (peripheral) image.

In some embodiments, whether the participant correctly selected the first target image (or not) and/or whether the participant correctly selected the first peripheral location may be recorded. In some embodiments, an indication, e.g., a graphical or audible indication, may be provided to the participant indicating the correctness or incorrectness of the participant's response, i.e., indicating whether the participant selected the target image correctly, and indicating whether the participant selected the first peripheral location correctly. For example, a "ding" or a "thunk" may be played to indicate correctness or incorrectness, respectively, and/or points may be awarded (in the case of a correct response). Of course, any other type of indication may be used as desired.

In 318, the presentation time may be adaptively modified based on the participant's selections. In other words, based on how the user responds, the method may modify the presentation time, e.g., decreasing the presentation time to make the exercise more difficult, or increasing the presentation time to make the exercise less difficult. Further details regarding adaptive modification of the presentation time (and possibly other attributes), as well as progressive modification of various other parameters of the exercise are provided below.

In 320, the visually presenting a first target image, visually indicating, visually presenting two or more candidate target images, requiring the participant to select the target image, and determining whether the participant correctly selected the first target image, requiring the participant to select the first peripheral location, determining whether the participant correctly selected the first peripheral location, and adaptively modifying the presentation time, may be repeated one or more times in an iterative manner to improve the participant's cognition. In some embodiments, after each trial, user input invoking initiation of a next trial may be received. For example, the participant may click on a "start", "next", or "continue" button (or functional equivalent) with a mouse to initiate the next trial.

The above visually presenting a first target image, visually indicating, visually presenting two or more candidate target images, requiring the participant to select the target image, and determining whether the participant correctly selected the first target image, requiring the participant to select the first peripheral location, determining whether the participant correctly selected the first peripheral location, and adaptively modifying the presentation time may compose a trial in the exercise. In the case of an incorrect response regarding the selection of the first target image, a trial may be limited to the visually presenting a first target image, visually indicating, visually presenting two or more candidate target images, requiring the participant to select the target image, and determining whether the participant correctly selected the first target image, since an incorrect response may prevent progressing to the next portion of the trial-the selection of the first peripheral location.

Exemplary Trial

Thus, in some embodiments, the exercise may utilize or implement a two part trial, where, simultaneously, one of two (or more) stimuli appears in a central area and another target (a peripheral location indicator) appears in one of a plurality (e.g., 8) possible locations in the periphery. The response may thus include two steps: 1) the participant indicates which stimulus appeared in the center, and 2) the participant indicates the region in which the peripheral stimulus appeared.

The following describes one embodiment of an exemplary trial, although it should be noted that this example trial is not intended to limit the trials to any particular form, function, or parameter values.

1. Trial Initiation: The participant may initiate a trial by clicking the Start button (see, e.g., FIG. 4A).
2. Stimulus Presentation:
    a. The cursor may disappear.
    b. One of two (or more) possible stimuli (target images) may be presented at the center of the screen for a short presentation time (which may be adapted each trial based on participant performance).
    c. Substantially concurrently with b., a peripheral stimulus may appear in one of a plurality of (e.g., eight) peripheral locations.
    d. After the presentation time, a mask may appear over both the central stimulus (the target image) and all possible locations of the peripheral stimulus (e.g., peripheral target) for 1000 ms, or, alternatively, the targets may be removed from the display.
    e. After the mask is removed, candidate central targets may appear so the participant can make a choice.
    f. The cursor may reappear.
3. Participant Response: The participant may respond to each part of the stimulus in turn.
    a. The participant may select one of the central stimuli (candidate target images).
        i. If this response is correct a "short ding" may be heard and the choice area may become green. A colored car may appear in the central location.
        ii. If this response is incorrect, a "thunk" may be heard and the choice area may be highlighted in purple, and the trial may be terminated.
    b. If the first response is correct, the participant may be required to select the region (location) in which the peripheral stimulus (peripheral target) appeared. The regions may be become highlighted as the participants cursor passes over them. In each region an arrow may point to one of four locations in which the central car could be added to a peripheral chain of cars. If the car added to the chain completes a group of three or more of the same colored cars, these cars may collapse, e.g., may be removed from the visual field.
        i. If the region in which the peripheral stimulus appeared is correctly identified, a "ding" sound may play, the region may be highlighted in green, and points may be awarded.
        ii. If the central car added to the chain creates a group of three of more like colored cars, those cars may disappear and point may be awarded for each car. A white car may advance around the chain.
        iii. The Start button may be displayed again.
        iv. If the region is incorrectly identified, a "thunk" sound may play, the region may be highlighted in purple, and the trial may be terminated.
    c. If the trial is terminated for an incorrect response:
        i. Both the central and peripheral stimuli from the trial may be revealed for a period of 1000 ms so the participant can see what the correct response was. If the participant clicks anywhere on the screen during this period, the stimuli may be removed and the Start button may appear.
        ii. After the 1000 ms, the stimuli may be removed and the Start button may be displayed again.

Note that the trial described above is meant to be exemplary only, and that in various other embodiments, trials may be structure differently, and/or in accordance with other parameter values, elements, or effects.

Thus, a plurality of trials may be performed in the exercise, where various target images, peripheral locations, and candidate target images are visually presented or indicated to the participant, as described above. For example, the repetitions may be performed over a plurality of sessions, e.g., over days, weeks, or even months, e.g., for a specified number of times per day, and for a specified number of days. In some embodiments, at the end of each session, the participant's score and thresholds for the session may be shown and may be compared to the best performance.

As noted above, based on the participant's responses, the method may adaptively modify the presentation time of the stimuli (the target image and the indication of the first peripheral location), and so the presentation time may be considered or termed the "adaptive dimension" of the exercise. Said another way, the adaptive dimension may be or include the presentation time of the concurrent stimuli.

Thus, in at least some (and possibly all) trials, and in response to the participant's indicated selection of the target image, the presentation time may be adjusted for the next trial's visual presentation, i.e., based on whether the participant indicated the target image correctly (or not), and/or whether the participant properly indicated the correct peripheral location. The adjustments may generally be made to increase the difficulty of the trials when the participant answers correctly (e.g., shortening the presentation time), and to decrease the difficulty of the trials when the participant answers incorrectly (e.g., increasing or lengthening the presentation time). Moreover, the adjustments may be made such that a specified level of performance, i.e., level of success, is approached and substantially maintained during performance of the exercise. For example, based on the participant's responses, the intensity of the visual searches may be adjusted to substantially achieve and maintain a specified success rate, e.g., 85% or 90%, for the participant, although other rates may be used as desired.

In preferred embodiments, the adjustments, i.e., the adaptive modifications, may be made using a maximum likelihood procedure, such as a QUEST (quick estimation by sequential testing) threshold procedure, or a ZEST (zippy estimation by sequential testing) threshold procedure, described below. In some embodiments, these adjustments (e.g., using ZEST) may be determined on a per condition basis (exemplary conditions are described below). In other words, for each condition (set of parameter values used in each task), the stimuli may be presented (and adjusted) in accordance with a maximum likelihood procedure (e.g., ZEST) applied to trials under that condition. In some embodiments, the starting presentation times of some of the configurations may be weighted based on the performance of past participants. In one embodiment, adjusting the presentation time to approach and substantially maintain a specified success rate for the participant may use a single stair maximum likelihood procedure.

Moreover, the repeating may also include performing threshold assessments in conjunction with, or as part of, the exercise. For example, the participant's performance may be assessed a plurality of times during the above repeating. A description of threshold determination/assessment is provided below.

Conditions

The repeating of 320 preferably includes trials performed under a variety of specified conditions, where each condition specifies one or more attributes of the trials, including, e.g., attributes of the images, peripheral locations, and/or their presentation, and possibly other exercise or game elements, e.g., with trials covering a range of attributes. More specifically, in various embodiments, each of the conditions may specify one or more of: colors, textures, shapes, sizes, object types, number, and/or orientations of objects, of the candidate target images; colors, textures, shapes, sizes, object types, number, and/or orientations of objects of the distracter images; colors, textures, shapes, and/sizes, object types, number, and/or orientations of objects of the peripheral target images; discriminability of candidate target images, distracter images, and/or peripheral target images; eccentricity of the peripheral target image and/or distracter images; background; distinguishability of presented images and backgrounds; or complexity of presented images and/or backgrounds, among others.

Such conditions may include baseline conditions, used before, after, and at specified points during, the exercise to assess the participant's performance (described further below), and non-baseline or training conditions, used for the actual training during the exercise. Thus, blocks of stimuli and trial attributes in general may implement particular conditions affecting or specifying the difficulty of the trials. In some embodiments, the conditions used may correspond to levels in the exercise.

In some embodiments, the conditions may be changed to control the difficulty of trials based on the participant's progress through the exercise. Thus, the modification of these condition parameters may be termed "progressive", in contrast to the "adaptive" modification of the presentation time mentioned above. Note, however, that while in some embodiments, the progressive modification of conditions may implement a substantially monotonically increasing difficulty throughout the application, in other embodiments, the progressive modification of conditions may proceed in a more complex fashion, e.g., increasing in difficulty with respect to some attributes for a number of trials, then decreasing the difficulty with respect to those attributes while increasing difficulty of others, progressing through sets of conditions multiple times, etc., as desired. It should be noted, however, that in other embodiments, some of the condition parameters or attributes may be modified in an adaptive manner as desired, i.e., may be modified adaptively, rather than progressively.

Various exemplary condition attributes are now presented, although it should be noted that the particular conditions described are meant to be exemplary only, and that other conditions and condition attributes or parameters may be used as desired.

Eccentricity

As noted above, in some embodiments, each peripheral location may have an associated eccentricity, where an image's eccentricity may refer to the distance from the center of the visual field, i.e., the fixation point, or to the angular distance from the fixation point to the location given a specified viewing distance from the screen. For example, exemplary eccentricity values may include absolute distance values, e.g., 5-9 inches, relative distance values, e.g., between ⅓ and ½ the screen radius, at least one "object size" away from the center, or, in the case of angular distance or subtense, 10, 15 and 20 degrees (or equivalents), at a viewing distance of 35 cm, although other values may be used as desired.

Note that an image's eccentricity value may make the visual search by the participant more or less difficult. For example, in some embodiments, peripheral locations (or images) with high eccentricities may be more difficult to process, given that the participant's attention is divided between the first target image, e.g., at the center of the visual field, and the peripheral locations, which, due to their eccentricities, may be located near the edge of the visual field. In some embodiments, the peripheral locations may be defined by both angular partitions and radial partitions, e.g., demarcated by concentric circles around the center of the visual field, reflecting different eccentricities.

Figure 7B:
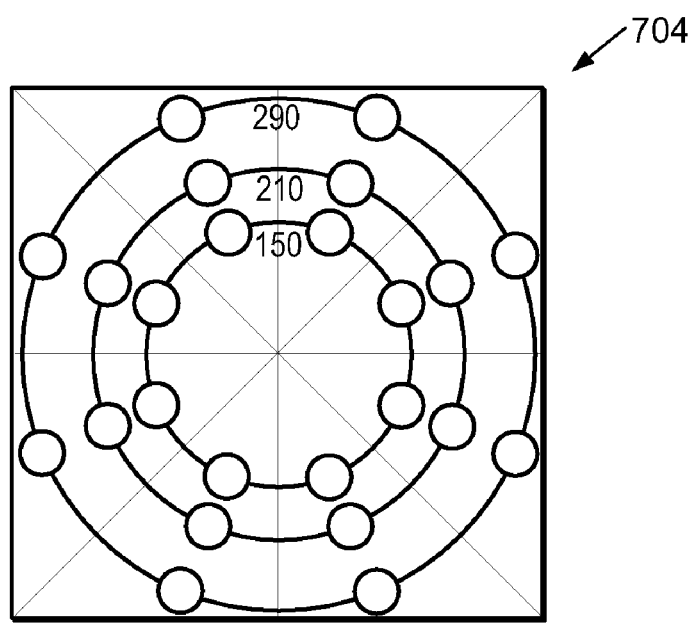
FIG. 7B illustrates a visual field with peripheral locations of various exemplary eccentricities, according to one embodiment.

FIG. 7B illustrates a visual field 704 with peripheral locations of various exemplary eccentricities. As may be seen, in this exemplary embodiment, there are three sets of peripheral locations, characterized by their radial distance (in pixels) from the center or fixation point, specifically, 150, 210, and 290 pixels, respectively. It should be noted, however, that these values are meant to be exemplary only, and that other distances, numbers of peripheral locations, numbers of eccentricity levels, and geometric arrangements, e.g., random placement around a ring, etc., may be used as desired.

Distracters

In one embodiment, distracter images, referred to as "distracters" for convenience, may be employed. In other words, the method may include providing one or more distracter images, where the distracter images are available for visual presentation to the participant. Visually presenting a peripheral target image may further include visually presenting at least one distracter image, where the at least one distracter image has a specified discriminability with respect to the peripheral target image.

Figure 6B:
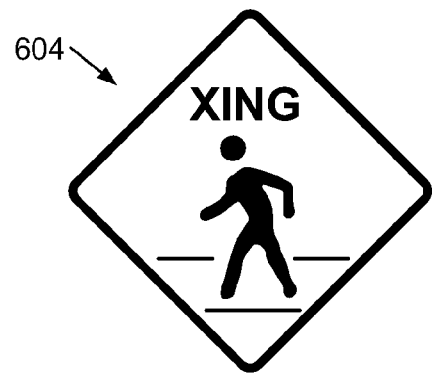

For example, various images may be displayed in the visual field that may operate to distract the participant with respect to identifying the first peripheral location. The distracters may share elements with the peripheral stimulus, but are preferably not be too similar. FIG. 6B illustrates an exemplary distracter, in this case, a "crossing sign", illustrating a person walking across a street. Note that this image is somewhat similar to the peripheral location image/indicator of FIG. 6A, e.g., line thickness, color, complexity, size, etc. In various embodiments, the conditions may specify the number of distracters and/or their appearance to increase or decrease the difficulty of trials, e.g., increasing or decreasing the number of distracters, the discriminability i.e., the relative difference in appearance, of distracters with respect to the peripheral location images (and possibly with respect to the target images), the distinguishability of the distracters with respect to background. Note that the more similar images are, the more information must be extracted from each image by the participant to discriminate among them, thus placing greater demand on the visual attentional system.

Figure 8A:
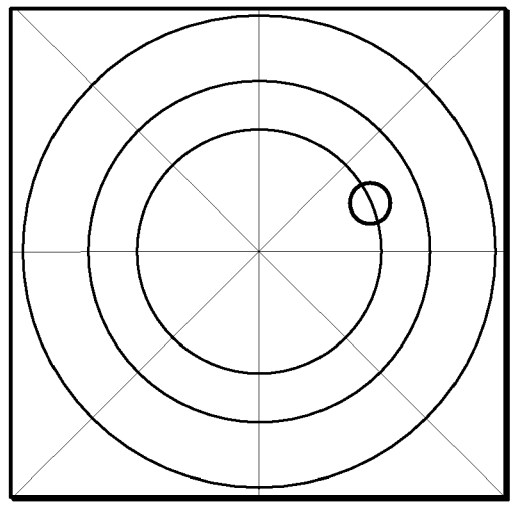
FIGS. 8A-8C illustrate exemplary visual fields with peripheral locations and various numbers of distracter images, according to one embodiment.
Figure 8B:
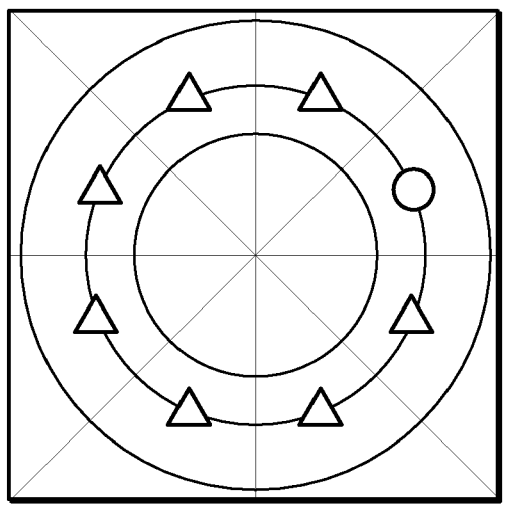
Figure 8C:
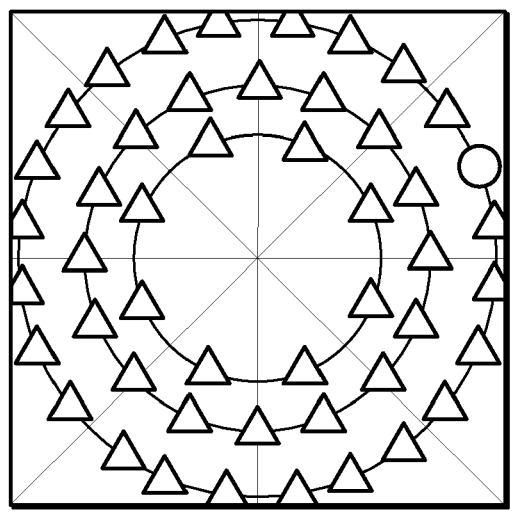

FIGS. 8A-8C illustrate exemplary visual fields with different numbers of distracters. In FIG. 8A, an exemplary visual field 802 is shown that includes an indicated peripheral location with low eccentricity (inner ring) and no distracters. FIG. 8B illustrates an exemplary visual field 804 that includes an indicated peripheral location with medium eccentricity (middle ring) and seven distracters presented with the same eccentricity, i.e., arranged around the middle ring. Thus, identifying the indicated peripheral location is more difficult in this case than that of FIG. 8A. FIG. 8C illustrates an exemplary visual field 806 that includes an indicated peripheral location with high eccentricity (outer ring) and many (8+16+23=47) distracters presented with the same eccentricity, i.e., arranged around the outer ring. As FIG. 8C makes clear, identifying the indicated peripheral location in this case is significantly more difficult than in the previous cases. Thus, the number of distracters may be progressively modified to control the difficulty of trials in the exercise. Note that while the example visual fields shown in these figures utilize three different levels (numbers) of distracters, in other embodiments, any number of distracters, and levels (numbers of distracters) may be used as desired. For example, in some embodiments, a condition may specify that 23 distracters be presented, e.g., in the outer ring, but with no distracters in the other rings (at other eccentricities), or that distracters be presented at a different eccentricity as the peripheral location, and so forth, as desired.

In some embodiments, the conditions may specify parameters in conjunction, as will be discussed below with respect to an exemplary training schedule or regimen.

Visual Emphasis

In some embodiments, visual emphasis techniques may be used (and varied) to make discriminating or distinguishing the target images, distracter images, peripheral locations, and/or backgrounds more or less difficult.

Age-related changes cause neural systems to respond more slowly and less robustly to preferred visual stimuli than they once did. In large part these changes are due to plastic reorganization of network properties that are locally adaptive, resulting in relatively unimpaired performance under a limited and specific range of environmental stimulation encountered by the aging organism. However, these changes are generally globally maladaptive, with simple task performance, such as central foveal detection, being relatively maintained at the cost of more complex and challenging visual tasks, such as peripheral object identification.

In order to renormalize visual processing in a global sense, the efficiency of mechanisms involved in complex, speeded task performance must be improved. In order to drive positive plasticity in these systems to improve their speed, accuracy, and overall function, slow and poorly tuned neurons and neural networks need to be strongly and coherently activated in the initial phases of training in a fashion that will engage these plastic mechanisms in a robust manner. In the context of adaptive visual training, i.e., training with visual stimuli, this effect can be elicited by initially strongly "emphasizing" the visual scene. As used herein, the term "visual emphasis" generally refers to creation of a combination of a target stimuli and/or backgrounds, where stimuli and/or backgrounds have been individually modified to have visual properties specifically chosen to drive cortical neurons strongly and coherently, and whose combination is specifically chosen to further enhance the overall configuration's ability to drive cortical neurons strongly and coherently. In other words, visual emphasis refers to image modification or manipulation that serves to increase the discriminability of target images, and/or the distinguishability of foreground objects, e.g., with respect to the background. Embodiments of the visual emphasis techniques described below are specifically designed to engage these neural mechanisms in a fashion that will robustly engage them and drive positive brain plasticity that leads to faster, more finely tuned processing.

There are several aspects or dimensions along which stimuli may be manipulated to create the visual emphasis levels. Some dimensions may be described with respect to the objects of interest in a scene, i.e., foreground objects, some with respect to the background of a scene, and some with respect to object/background relations. In some embodiments, the manipulations described herein may occur at two levels; the first level being the a priori level of stimulus selection and artistic design. In other words, the stimuli may be illustrated, animated or selected based on the principles described herein. The second level is the post hoc level of post-processing manipulations. Each manipulation may map to a corresponding image-processing algorithm. Commercially available programs such as Photoshop®, provided by Adobe Systems Incorporated, implement many of these algorithms. Moreover, many of these algorithms may be implemented using image processing packages such as those available in Matlab®, provided by The MathWorks. Of course, any other means for performing the image processing or manipulations described herein may be used as desired. Note that the appropriate application of visual emphasis manipulations may depend on the visual task, e.g., based on the exercise, and/or the level of progress in the exercise, and thus, not all dimensions of emphasis may apply in all cases.

Below are described exemplary aspects of visual stimuli that may be manipulated for visual emphasis. It should be noted, however, that the aspects or parameters described are meant to be exemplary only, and are not intended to limit the visual aspects used for visual emphasis to any particular set or type of visual attributes.

Image Discriminability

As noted above, in various embodiments, the discriminability of images may be specified to affect the difficulty of trials in the exercise, e.g., between candidate target images or between distracters and peripheral location indicators or images, etc. The discriminability may be determined or implemented via any of a variety of image attributes, such as, but not limited to, colors, textures, shapes, sizes, complexity, object types imaged, and/or orientations. Any other attributes may be used to effect or implement the specified discriminability of the images.

Backgrounds

In some embodiment, various backgrounds may be used to affect the difficulty of the exercise. For example, backgrounds with specified levels of distinguishability may be used, where distinguishability refers to the degree to which images may be distinguished against the background. Thus, for example, the distinguishability of a relatively featureless background would be less than that of a complex, multi-featured background, since images are significantly easier to detect and identify against a simple background than against a complex background. Exemplary backgrounds with differing distinguishabilities may include a desert background (high distinguishability), a countryside background (middle distinguishability), and an urban or city background (low distinguishability), among others. Note that other background schemes and numbers of levels of distinguishability may be used as desired.

Figure 16A:
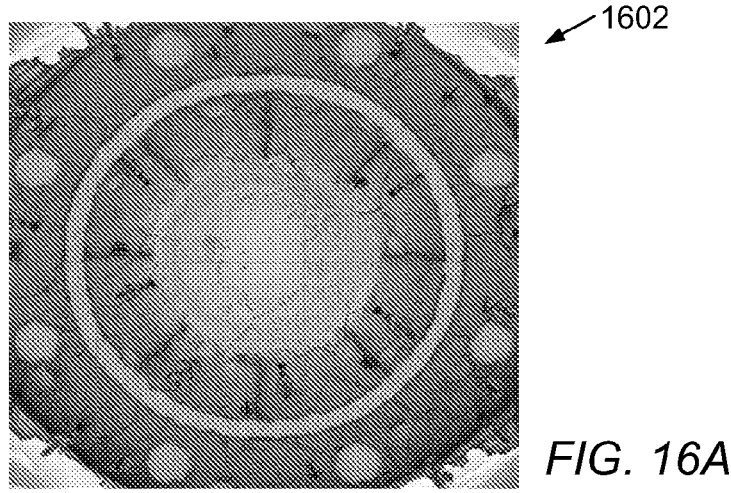
FIGS. 16A-16C illustrate exemplary backgrounds with different distinguishabilities, according to one embodiment.
Figure 16B:
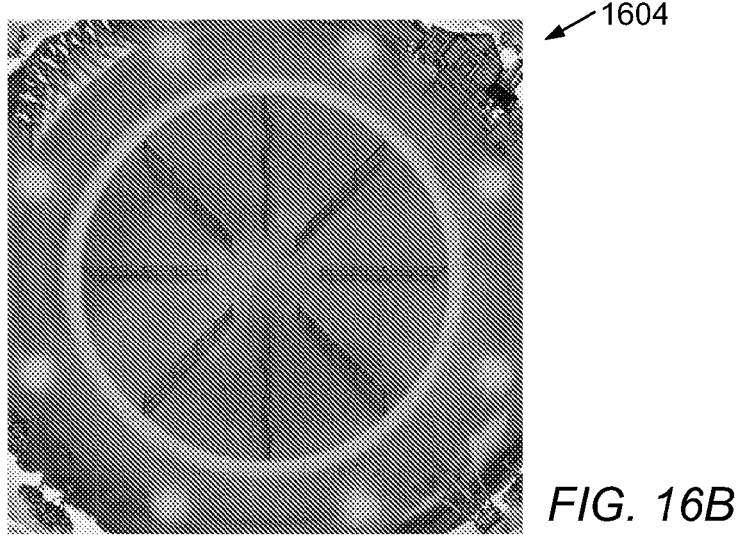
Figure 16C:
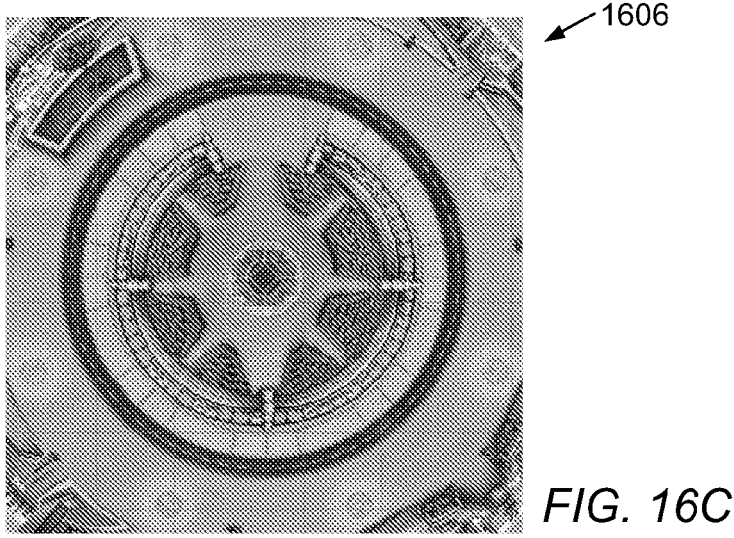

FIGS. 16A-C illustrates respective exemplary backgrounds, specifically, a low visual emphasis/high distinguishability desert background, a medium emphasis/medium distinguishability countryside background, and a high visual emphasis/low distinguishability urban or city background, respectively. Thus, various backgrounds may be used to implement conditions wherein images are more or less difficult to detect and/or identify against the background.

Thus, the conditions for the trials may specify one or more of: colors, textures, shapes, sizes, orientations, object types shown, number, eccentricity, and location of the images (e.g., candidate target images, distracter images, and/or peripheral target images), as well as background, and complexity and/or visual emphasis of the images and/or the background, although it should be noted that any other attributes may be used as desired. In some embodiments, each condition may specify any or all of the above, and may also specify the number and type of candidate target images, and/or any distinguishing attributes of the candidate target images or backgrounds (e.g., discriminability, distinguishability, image complexity, etc.). As mentioned above, other attributes may be used as desired.

In some embodiments, the conditions may be utilized according to a specified schedule or training regimen, as described below.

Exemplary Training Regimen

As noted above, there are a variety of ways that trials may be performed over the course of the exercise. For example, in some embodiments, parameters such as eccentricity (of image placement), the number of distracters, and visual emphasis level (among others), may be varied after some number of correct trials, e.g., 50, have been performed.

For example, in one embodiment, the participant may be trained at a specified eccentricity at a time, with candidate images of a specified discriminability, a specified number of distracters, and a specified background. It may be important to train in one type of condition at a time to maximize the training effect.

In one exemplary training schedule or regimen, three sets of central stimuli (target images) in each of three emphasis levels may be used, where the difficulty discriminating between the candidate target images may increase from the first to the third set in each level. In one embodiment, variations of cars and trucks may be used for all sets, although in other embodiments, any images may be used as desired. In one exemplary embodiment, each central stimulus, e.g., target image, may be approximately 65 pixels wide, although any other sizes may be used as desired. The following presents an exemplary ordering of (candidate) target images:

TABLE 1

Central Stimulus Ordering

| Set Number | Target A | Target B | Discriminability | Emphasis Level |
|---|---|---|---|---|
| 1 | Target 1A | Target 1B | Easy | 1 - Desert |
| 2 | Target 2A | Target 2B | Medium | 1 - Desert |
| 3 | Target 3A | Target 3B | Hard | 1 - Desert |
| 4 | Target 4A | Target 4B | Easy | 2 - Countryside |
| 5 | Target 5A | Target 5B | Medium | 2 - Countryside |
| 6 | Target 6A | Target 6B | Hard | 2 - Countryside |
| 7 | Target 7A | Target 7B | Easy | 3 - City |
| 8 | Target 8A | Target 8B | Medium | 3 - City |
| 9 | Target 9A | Target 9B | Hard | 3 - City |

As may be seen, in this embodiment, target image pairs are presented in an order that includes varying discriminability and visual emphasis level (described below).

Figure 14:
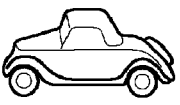
FIG. 14 illustrates an exemplary collection of target images, according to one embodiment.
Figure 14:
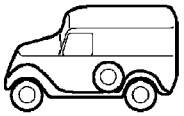
Figure 14:
Figure 14:
Figure 14:
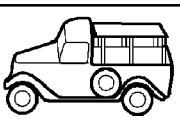
Figure 14:
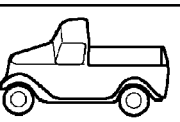
Figure 14:
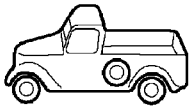
Figure 14:
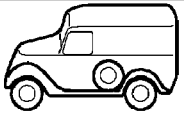
Figure 14:
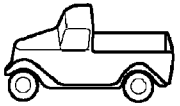
Figure 14:
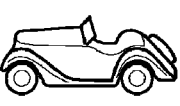
Figure 14:
Figure 14:
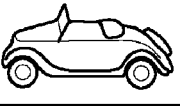
Figure 14:
Figure 14:
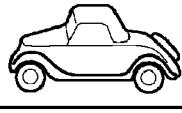
Figure 14:
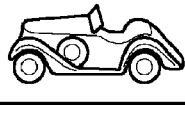
Figure 14:
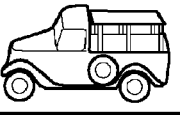
Figure 14:
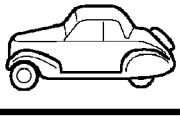
Figure 14:
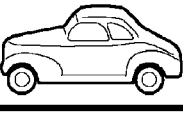

FIG. 14 presents an exemplary collection of target images, where, as may be seen, pairs of target images (Target A/Target B) with various discriminabilities are specified.

In some embodiments, the peripheral target may be perceivable by the participant without a visual search both with and without distracters. In other words, the participant preferably does not have to visually search the visual field to perceive the peripheral targets. The following presents an exemplary characterization of peripheral stimulus (peripheral target) sets.

TABLE 2

Peripheral Stimulus Sets

| Set Number | Target | Distracter | Discriminability | Emphasis Level |
|---|---|---|---|---|
| 1 | Target 1 | Distracter 1 | Easy | 1 - Desert |
| 2 | Target 1 | Distracter 2 | Easy | 2 - Countryside |
| 3 | Target 1 | Distracter 3 | Easy | 3 - City |

Note that while these exemplary peripheral targets all have the same discriminability levels, in other embodiments, peripheral targets with differing discriminability levels may be used. In some embodiment, peripheral stimuli may have a size of approximately 50 pixels wide, e.g., may fit within a 50 pixel diameter circle, although other sizes may be used as desired. In one embodiment, there may be a single peripheral stimulus (e.g., the Route 66 sign of FIG. 6A) for all emphasis levels, although in other embodiments, multiple different peripheral stimuli may be used as desired.

FIG. 15 presents an exemplary collection of peripheral target images and distracters. Note that the peripheral target images are all the same, whereas the distracters vary, e.g., in correspondence with the visual emphasis level.

In one embodiment, a different peripheral distracter (e.g., themed) may be used for each emphasis level. In other words, there may be a different peripheral stimulus for each emphasis level, where, for example, each peripheral stimulus may have three different distracters that are progressively less easy to discriminate from the peripheral location indicator (e.g., the peripheral target). Table 3 presents exemplary peripheral stimulus sets according to this approach.

TABLE 3

Peripheral Stimulus Sets

| Set Number | Target | Distractor | Discriminability | Emphasis Level |
|---|---|---|---|---|
| 1 | Target 1 | Distractor 1 | Easiest | 1 - Desert |
| 2 | | Distractor 2 | Easier | 1 - Desert |
| 3 | | Distractor 3 | Easy | 1 - Desert |
| 4 | Target 2 | Distractor 4 | Easiest | 2 - Countryside |
| 5 | | Distractor 5 | Easier | 2 - Countryside |
| 6 | | Distractor 6 | Easy | 2 - Countryside |
| 7 | Target 3 | Distractor 7 | Easiest | 3 - City |
| 8 | | Distractor 8 | Easier | 3 - City |
| 9 | | Distractor 9 | Easy | 3 - City |

The method or exercise may include a plurality of training categories. For example, in one exemplary embodiment, there may be 4 training categories as follows, where each condition may specify a value for each category. It should be noted that the particular values of attributes and/or numbers of different values used in the method or exercise as described herein are meant to be exemplary only, and are not intended to limit the values or sets of values to any particular values or numbers.

1. Eccentricity:

In one embodiment, the eccentricity of peripheral targets may assume one of three values, e.g., 150, 210, or 290 pixel radii from the center of the visual field, as illustrated in FIG. 7B.

2. Distracter number (3 values)

In one embodiment, the number of distracters may assume one of three values:

0—No distracters;

7—Distracters only in potential target locations in current eccentricity; or

47—Maximum number of distracters, although of course, other values may be used as desired. In the third case, the distracters may have different eccentricities. For example, assuming the three eccentricity values mentioned above, the maximum distracters be distributed with the following eccentricities:

Eccentricity 1—Distracters in target location (8; 7 if target present);

Eccentricity 2—Distracters in target locations and in-between (16; 15 if target present); and Eccentricity 3—Distracters in target locations with two in-between (24; 23 if target present).

The above exemplary distracter placement schemes are illustrated in FIGS. 8A-8C, described above.

3. Stimuli discriminability (3 sets):

In one embodiment, the discriminability of the images, e.g., of the candidate target images, may be easy, medium, or hard, as indicated above with reference to Table 1.

4. Emphasis level (3 levels)

In one embodiment, emphasis level may refer to the background and its relation to the stimuli (presented images). In the easiest level the background may be plain with little detail (e.g. a desert scene). The middle level may have moderate complexity (e.g., countryside), and the hardest level may include many elements, some of which may be similar to the peripheral target (e.g. city), although other backgrounds and themes may be used as desired, as will be discussed further below. Note that the emphasis level may include or be implemented via distinguishability, which refers to the degree to which presented images are perceivable against or with respect to a background.

Thus, the above parameters or categories may be specified to generate a plurality of conditions or configurations under which trials may be performed. For example, in one embodiment, each condition or configuration may require performance of a specified number of correct trials before proceeding to the next condition or configuration, e.g., 35, or may require some other criteria to be met, e.g., achieving some specified level, e.g., percentage, of correctness over some number of trials.

Configuration/Condition Order

In some embodiments, the above described conditions or configurations may be applied according to a predefined schedule or regimen, e.g., according to a configuration matrix, such as the exemplary configuration matrix of Table 4, where 81 different configurations (conditions) are scheduled. Table 5 provides keys for interpreting the configurations or conditions of Table 4. As may be seen, in addition to specified configuration, eccentricity, number of distracters, car set, peripheral set, emphasis, and difficulty, Table 4 also includes a specification for a ZEST weighting factor, which is the weighting factor for the initial threshold of each configuration, more specifically, this is the log factor by which the final threshold of the previous configuration may be adjusted for the initial threshold of the current configuration, as discussed at length in the section below labeled Threshold Determination/Assessment.

TABLE 4

Configurations

| Configuration | Eccentricity | Distracter # | Car Set | Peripheral Set | Emphasis | Zest Weighting Factor | Difficulty Scale |
|---|---|---|---|---|---|---|---|
| 1 | 1 | 1 | 1 | 1 | 1 | Assessment threshold | 1.349 |
| 2 | 2 | 1 | 1 | 1 | 1 | 0.089 | 1.598 |
| 3 | 3 | 1 | 1 | 1 | 1 | 0.071 | 1.838 |
| 4 | 1 | 2 | 1 | 1 | 1 | 0.293 | 3.367 |
| 5 | 2 | 2 | 1 | 1 | 1 | 0.09 | 4.081 |
| 6 | 3 | 2 | 1 | 1 | 1 | 0.072 | 4.774 |
| 7 | 1 | 3 | 1 | 1 | 1 | −0.058 | 4.210 |
| 8 | 2 | 3 | 1 | 1 | 1 | 0.091 | 5.127 |
| 9 | 3 | 3 | 1 | 1 | 1 | 0.073 | 6.020 |
| 10 | 1 | 1 | 2 | 1 | 1 | −0.608 | 1.676 |
| 11 | 2 | 1 | 2 | 1 | 1 | 0.091 | 2.008 |
| 12 | 3 | 1 | 2 | 1 | 1 | 0.074 | 2.333 |

TABLE 4-continued

Configurations

| Configuration | Eccentricity | Distracter # | Car Set | Peripheral Set | Emphasis | Zest Weighting Factor | Difficulty Scale |
|---|---|---|---|---|---|---|---|
| 13 | 1 | 2 | 2 | 1 | 1 | 0.296 | 4.365 |
| 14 | 2 | 2 | 2 | 1 | 1 | 0.092 | 5.335 |
| 15 | 3 | 2 | 2 | 1 | 1 | 0.075 | 6.286 |
| 16 | 1 | 3 | 2 | 1 | 1 | −0.056 | 5.561 |
| 17 | 2 | 3 | 2 | 1 | 1 | 0.093 | 6.823 |
| 18 | 3 | 3 | 2 | 1 | 1 | 0.075 | 8.063 |
| 19 | 1 | 1 | 3 | 1 | 1 | −0.657 | 1.974 |
| 20 | 2 | 1 | 3 | 1 | 1 | 0.093 | 2.385 |
| 21 | 3 | 1 | 3 | 1 | 1 | 0.076 | 2.791 |
| 22 | 1 | 2 | 3 | 1 | 1 | 0.298 | 5.290 |
| 23 | 2 | 2 | 3 | 1 | 1 | 0.094 | 6.504 |
| 24 | 3 | 2 | 3 | 1 | 1 | 0.076 | 7.702 |
| 25 | 1 | 3 | 3 | 1 | 1 | −0.054 | 6.831 |
| 26 | 2 | 3 | 3 | 1 | 1 | 0.094 | 8.424 |
| 27 | 3 | 3 | 3 | 1 | 1 | 0.077 | 10.000 |
| 28 | 1 | 1 | 4 | 2 | 2 | −1.082 | 1.061 |
| 29 | 2 | 1 | 4 | 2 | 2 | 0.095 | 1.257 |
| 30 | 3 | 1 | 4 | 2 | 2 | 0.077 | 1.452 |
| 31 | 1 | 2 | 4 | 2 | 2 | 0.299 | 2.640 |
| 32 | 2 | 2 | 4 | 2 | 2 | 0.095 | 3.222 |
| 33 | 3 | 2 | 4 | 2 | 2 | 0.077 | 3.801 |
| 34 | 1 | 3 | 4 | 2 | 2 | −0.053 | 3.394 |
| 35 | 2 | 3 | 4 | 2 | 2 | 0.095 | 4.163 |
| 36 | 3 | 3 | 4 | 2 | 2 | 0.078 | 4.928 |
| 37 | 1 | 1 | 5 | 2 | 2 | −0.604 | 1.418 |
| 38 | 2 | 1 | 5 | 2 | 2 | 0.095 | 1.704 |
| 39 | 3 | 1 | 5 | 2 | 2 | 0.078 | 1.989 |
| 40 | 1 | 2 | 5 | 2 | 2 | 0.3 | 3.714 |
| 41 | 2 | 2 | 5 | 2 | 2 | 0.096 | 4.567 |
| 42 | 3 | 2 | 5 | 2 | 2 | 0.078 | 5.416 |
| 43 | 1 | 3 | 5 | 2 | 2 | −0.052 | 4.831 |
| 44 | 2 | 3 | 5 | 2 | 2 | 0.096 | 5.962 |
| 45 | 3 | 3 | 5 | 2 | 2 | 0.078 | 7.088 |
| 46 | 1 | 1 | 6 | 2 | 2 | −0.654 | 1.769 |
| 47 | 2 | 1 | 6 | 2 | 2 | 0.096 | 2.144 |
| 48 | 3 | 1 | 6 | 2 | 2 | 0.078 | 2.518 |
| 49 | 1 | 2 | 6 | 2 | 2 | 0.3 | 4.774 |
| 50 | 2 | 2 | 6 | 2 | 2 | 0.096 | 5.895 |
| 51 | 3 | 2 | 6 | 2 | 2 | 0.078 | 7.012 |
| 52 | 1 | 3 | 6 | 2 | 2 | −0.052 | 6.252 |
| 53 | 2 | 3 | 6 | 2 | 2 | 0.096 | 7.740 |
| 54 | 3 | 3 | 6 | 2 | 2 | 0.079 | 9.226 |
| 55 | 1 | 1 | 7 | 3 | 3 | −1.08 | 1.000 |
| 56 | 2 | 1 | 7 | 3 | 3 | 0.096 | 1.186 |
| 57 | 3 | 1 | 7 | 3 | 3 | 0.079 | 1.371 |
| 58 | 1 | 2 | 7 | 3 | 3 | 0.301 | 2.486 |
| 59 | 2 | 2 | 7 | 3 | 3 | 0.096 | 3.041 |
| 60 | 3 | 2 | 7 | 3 | 3 | 0.079 | 3.595 |
| 61 | 1 | 3 | 7 | 3 | 3 | −0.052 | 3.221 |
| 62 | 2 | 3 | 7 | 3 | 3 | 0.097 | 3.960 |
| 63 | 3 | 3 | 7 | 3 | 3 | 0.079 | 4.697 |
| 64 | 1 | 1 | 8 | 3 | 3 | −0.602 | 1.364 |
| 65 | 2 | 1 | 8 | 3 | 3 | 0.097 | 1.640 |
| 66 | 3 | 1 | 8 | 3 | 3 | 0.079 | 1.916 |
| 67 | 1 | 2 | 8 | 3 | 3 | 0.301 | 3.577 |
| 68 | 2 | 2 | 8 | 3 | 3 | 0.097 | 4.405 |
| 69 | 3 | 2 | 8 | 3 | 3 | 0.079 | 5.233 |
| 70 | 1 | 3 | 8 | 3 | 3 | −0.051 | 4.677 |
| 71 | 2 | 3 | 8 | 3 | 3 | 0.097 | 5.780 |
| 72 | 3 | 3 | 8 | 3 | 3 | 0.079 | 6.882 |
| 73 | 1 | 1 | 9 | 3 | 3 | −0.653 | 1.726 |
| 74 | 2 | 1 | 9 | 3 | 3 | 0.097 | 2.093 |
| 75 | 3 | 1 | 9 | 3 | 3 | 0.079 | 2.460 |
| 76 | 1 | 2 | 9 | 3 | 3 | 0.301 | 4.665 |
| 77 | 2 | 2 | 9 | 3 | 3 | 0.097 | 5.766 |
| 78 | 3 | 2 | 9 | 3 | 3 | 0.079 | 6.866 |
| 79 | 1 | 3 | 9 | 3 | 3 | −0.051 | 6.129 |
| 80 | 2 | 3 | 9 | 3 | 3 | 0.097 | 7.596 |
| 81 | 3 | 3 | 9 | 3 | 3 | 0.079 | 9.062 |

TABLE 5

Key for Configuration Matrix

| Index | Eccentricity (pixels) | Distracters | Car Set | Peripheral Set | Emphasis level |
|---|---|---|---|---|---|
| 1 | 150 | None | [See Stimuli section above] | [See Stimuli section above] | 1 |
| 2 | 210 | Some - 7 | | | 3 |
| 3 | 290 | Many - 47 | | | 5 |

In the above schedule, the number of correct trials per configuration is 35; however, it should be noted that the above training schedule or regimen is meant to be exemplary only, and is not intended to limit the training schedule or regimen used to any particular approach.

Game Elements

In some embodiments, the exercise may utilize or implement any of various game elements, e.g., to increase the interest and entertainment of the participant. The following presents various exemplary game elements, but are not intended to limit the game elements contemplated to any particular form, function, or appearance.

Game Mechanics

In one exemplary embodiment, the game may be based on a journey along route 66. When the participant enters the game, have a uniquely identified car (e.g., white) may appear in a ring packed with other colored cars (e.g., red, green, and yellow). The goal is to clear out the other cars by creating groups of three adjacent cars of the same color. Each time this is achieved, the group of cars will be removed from the screen and the participant's car may move forward, e.g., along a course or track. Such removal of a group of cars may be referred to herein as "collapsing" the group.

Setting Up the Car Ring

In one embodiment, the white (participant's) car may always appear at the top of the ring at the start of a configuration. The color cars may be randomly chosen to fill in the rest of the ring, though three cars of the same color should not be placed side by side to prevent "collapses" when the ring is first populated with cars).

Moving Around the Ring

Figure 9A:
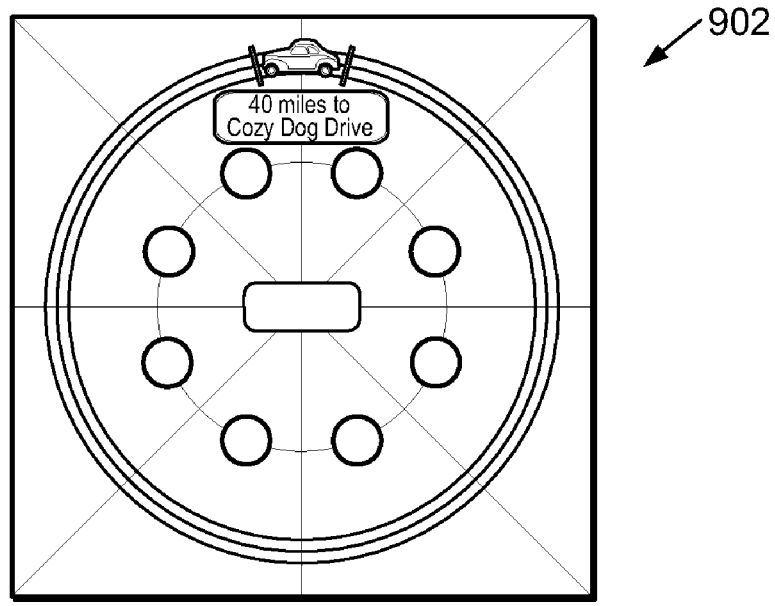
FIG. 9A illustrates an exemplary roadside attraction mileage marker, according to one embodiment.
Figure 9B:
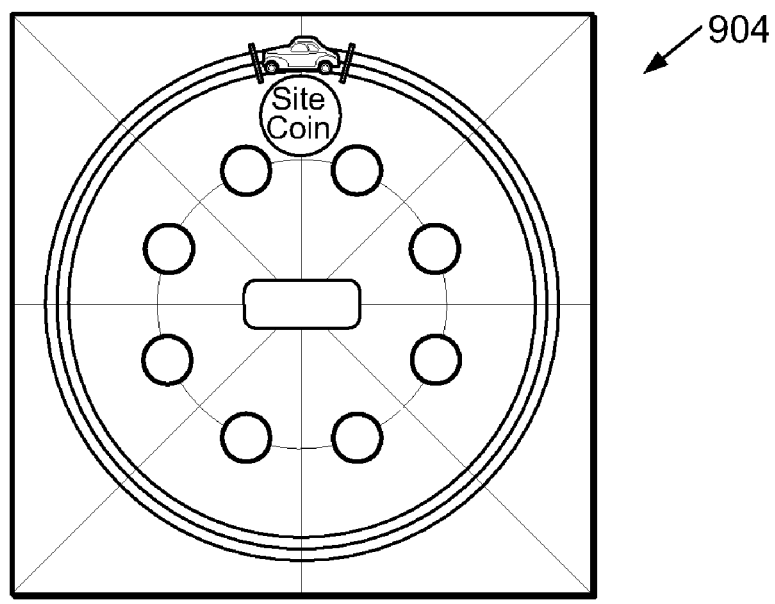
FIG. 9B illustrates an exemplary roadside attraction site token, according to one embodiment.

As the participant's car travels (rotates) around the on-screen ring or track, mileage markers marking the participant's progress toward different roadside attractions may be passed, e.g., "40 miles to Cozy Dog Drive-in", as illustrated in FIG. 9A, which presents an exemplary wireframe layout 902 where the participant's car is presented at the top of the track, and where the distance to the "Cozy Dog Drive-in" roadside attraction is indicated. In one embodiment, once the participant has completed enough rotations to reach the site, the site may be added to a sidebar (described below) with text describing that attraction. In one embodiment, each time the white car (i.e., the participant's car) completes a rotation, it may pause for a moment at the starting position while a reward sound plays, and a mileage sign mileage number may be reduced or a token awarded. FIG. 9B illustrates award of a site token or coin to the participant upon reaching the roadside attraction.

As noted above, the game may start in the desert, progress though the country side, and end in an urban setting, e.g., Chicago. Thus, the participant may start with a very simple background (the desert), travel through a richer environment (e.g., the country side), and finally end in the city with a very complex background.

General Layout

In one exemplary embodiment, the ring may contain a specified number of cars, e.g., 32 cars, each with a specified length, e.g., 45 pixels. The car size and number of cars may facilitate or provide the flexibility to create numerous different ring sizes to accommodate all of the specified eccentricities of the peripheral locations. Thus, for example, in one embodiment, all rings may contain 32 cars and all rings may use the same cars assets.

In one embodiment, the car ring may include cars that are the same type but have different colors, e.g., red, green, and yellow, although other colors may be used as desired. The lead car may be identified by a unique color (white) and a distinct shape, and thus should be easily perceivable to the participant as the main focus of the game.

Figure 10A:
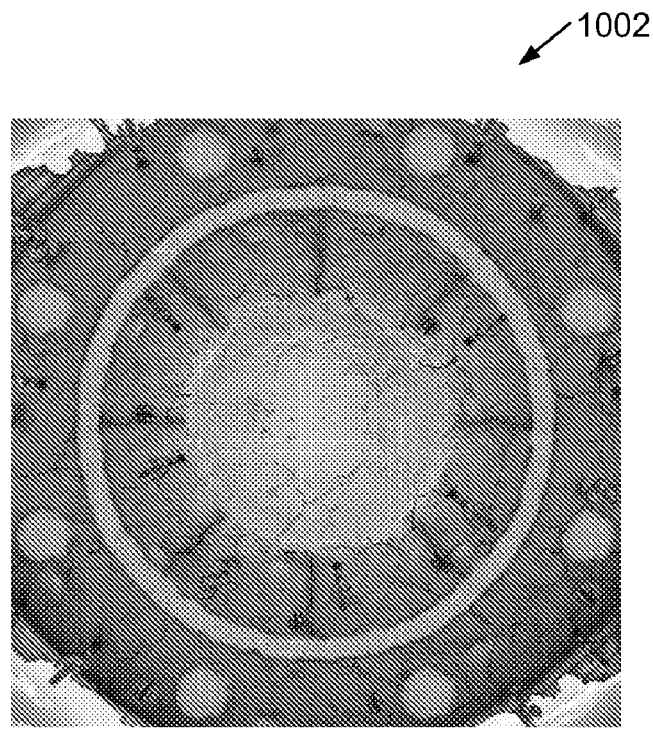
FIGS. 10A and 10B illustrate exemplary visual field layouts with single and double car rings, respectively, according to one embodiment.
Figure 10B:
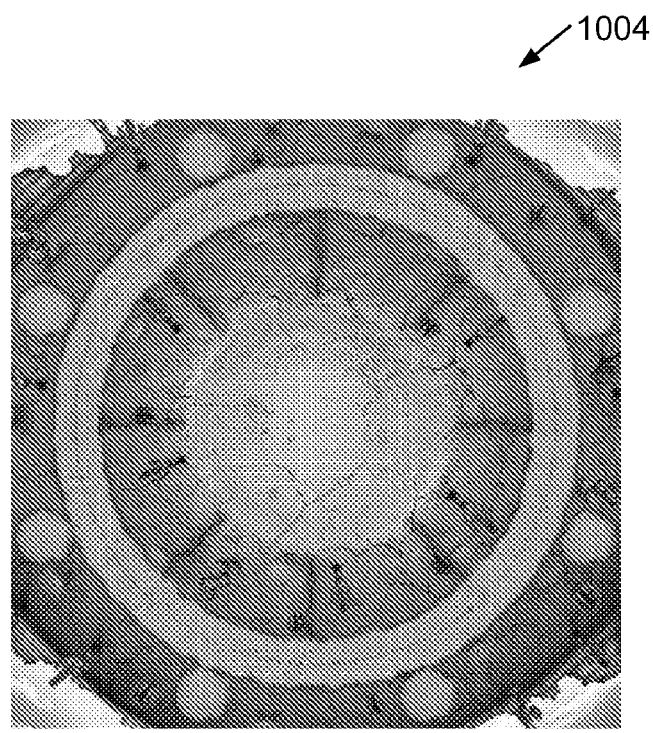

In some embodiments, there may be three basic background types (e.g., desert, countryside, and city), where each of these background types may include a number of different layouts (e.g., three) for the different specified eccentricities. FIGS. 10A and 10B are example backgrounds of a desert scene with large eccentricity peripheral locations. Note that the low complexity of these backgrounds makes the detection and identification of targets easier.

In some embodiments, the game may utilize single or multiple car rings. This feature is illustrates in FIGS. 10A and 10B, where, as may be seen, the layout of FIG. 10B includes a single road, whereas that of FIG. 10B includes a double road, e.g., two car rings.

Figure 11A:
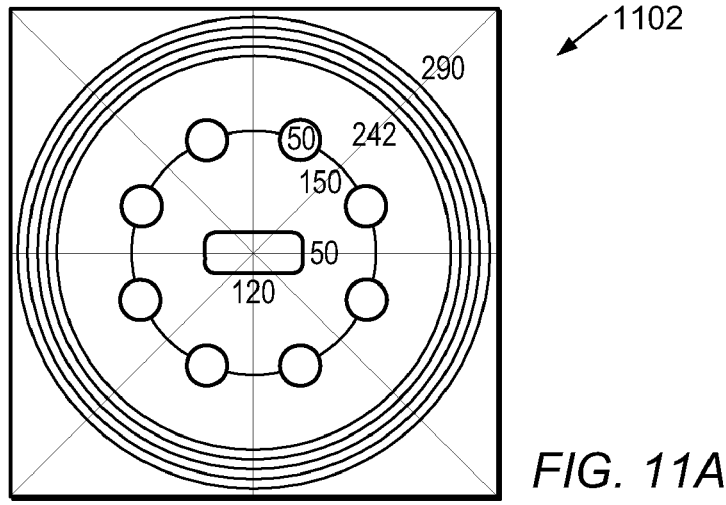
FIGS. 11A-11C illustrate exemplary visual fields with peripheral locations and car rings of various eccentricities, according to one embodiment.
Figure 11B:
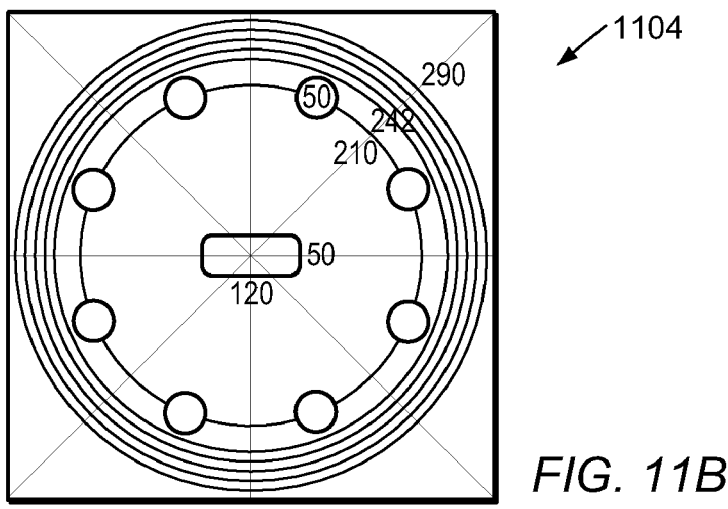
Figure 11C:
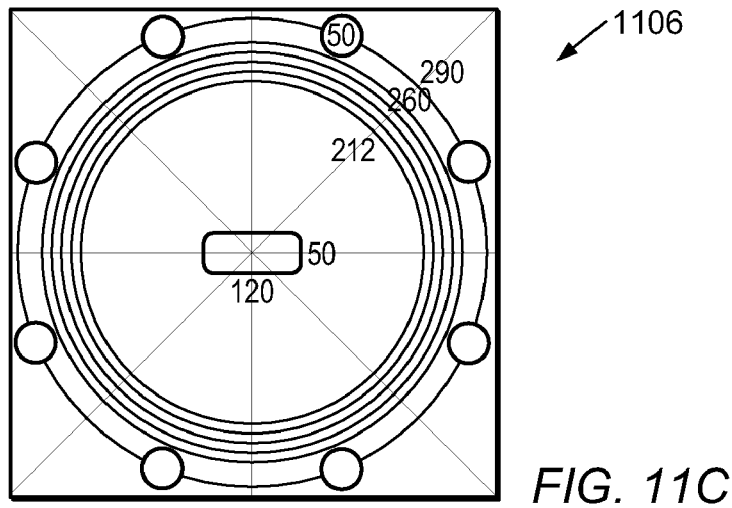

In some embodiments, the eccentricity of the peripheral locations may determine the location, e.g., radius, of the car ring(s). For example, in one embodiment, the car rings for the first two eccentricities (e.g., low and medium) may be in the same location, but may be moved in for the furthest (e.g., high) eccentricity. In other words, when the peripheral locations have high eccentricity, the car rings (i.e., roads) may be moved inward to accommodate them. FIGS. 11A, 11B, and 11C illustrate this concept, where in FIG. 11A, the layout 1102 includes peripheral locations with low eccentricity, e.g., 150 pixel radius, and a car ring with radii of 242-pixels (inner) and 290-pixels (outer). FIG. 11B illustrates a layout 1104 with peripheral locations with medium eccentricity, e.g., 210 pixel radius, and a car ring with inner and outer radii of 242 and 290 pixels, respectively, i.e., with the same car ring size as the low-eccentricity case. Finally, FIG. 11B illustrates a layout 1106 with peripheral locations of high eccentricity, e.g., 290 pixel radius, and so the car ring is moved inward, giving inner and outer radii of 212 and 260 pixels, respectively.

As FIGS. 10A-10B and 11A-11C indicate, in some embodiments there may be 8 peripheral locations, i.e., outlying markers, e.g., presented as white bumps, that let the participant know where they need to be looking for the peripheral stimulus. For clarity, with the exception of the markers, this area may be a solid color and may not contain any other visual information.

Game Play Variations

While the above describes one exemplary embodiment of game play suitable for implementing and enhancing the exercise, any alternative variations of game play may be used as desired. Below are described various exemplary game modifications and styles contemplated for the above method, although it should be noted that they are intended to be exemplary only, and are not intended to limit the game play or game elements to any particular style or set of elements.

Paint Trucks

As cars collapse, paint trucks may occasionally be added to the ring in place of new cars. A paint truck may explode when hit with a car (any color). When a paint truck explodes it may color three cars in front and three cars behind the same color. All seven vehicles (including the paint truck) may then collapse. The color change may not affect the white car, or cars in other rings (e.g., a double-decker ring), but may affect other paint trucks and tow trucks.

Tow Trucks

As cars collapse, tow trucks may occasionally be added to the ring in place of new cars. To activate a tow truck two cars of the same color are placed next to it. When a tow truck is activated it may travel a complete loop of the ring, removing (collapsing) all cars of the same color in the ring. The tow truck action may not affect the white car, but it may remove other tow trucks if they are the same color.

Speed Traps (Police Cars)

In this version of the game the participant may try to knock out speed traps, by hitting the speed traps (police cars) on the side of the road with car that is the same color indicated by the police car. If the police car contains all three colors then any color car may be used to knock them out. Once all the police cars are knocked out then all the cars in the ring may turn the same color. This may also affect paint trucks and tow trucks, but may not affect the lead car.

Double-Decker

In this embodiment, there may be two rings of cars instead of one. Hitting cars in the inner ring may cause the car to be knocked into the outer ring. Note that this may allow participants to create cascading collapses. The lead car is always in the outer ring, so the participant needs to knock cars into the outer (second) ring to create collapses.

Order and Frequency

Introduction of new game elements may be coordinated with configuration changes. Table 6 below provides an exemplary schedule that indicates which game elements are available in each configuration, including a configuration identifier column, a game element column indicating the game elements addressed, and a frequency column that indicates the likelihood of introducing the game element. For example, the frequency column applies to the tow trucks and paint trucks that are substituted for replacement cars in the ring at the frequency indicated. When both tow trucks and paint trucks can appear, the frequency may indicate the chance that one or the other (chosen randomly) will appear.

In some embodiments, game elements may affect each other's frequency. For example, in one embodiment, if a tow truck or paint truck is scheduled to appear in a configuration, they may be substituted for new cars at a rate of 10% of the time, but if a speed trap is also available, this frequency may be reduced to 5%. Other frequency values and effects may be implemented as desired.

TABLE 6

Exemplary Game Element Schedule

| Configuration | Game Elements | Frequency |
| --- | --- | --- |
| 1 | Single ring | NA |
| 2 | Single ring | NA |
| 3 | Single ring | NA |
| 4 | Single ring | NA |
| 5 | Single, Paint truck | 5% |
| 6 | Single, Paint truck | 5% |
| 7 | Single, Paint truck | 5% |
| 8 | Single, Paint truck | 5% |
| 9 | Single, Speed traps (2 any color) | NA |
| 10 | Single, Speed traps (1 any color, 1 red) | NA |
| 11 | Single, Speed traps (2 any color, 1 green, 1 blue) | NA |
| 12 | Single, Tow truck | 5% |
| 13 | Single, Tow truck | 5% |
| 14 | Single, Tow truck | 5% |
| 15 | Double Decker | NA |
| 16 | Double Decker, Roadside Paint Can | 5% |
| 17 | Double Decker, Tow truck | 5% |
| 18 | Single, Roadside Paint Can | 5% |
| 19 | Single, Tow truck | 5% |
| 20 | Single, Speed Trap (2 any color, 1 blue, 1 red) and Roadside Paint Can | 5% |
| 21 | Single, Speed Trap (2 any color, 1 blue, 1 red) and Roadside Paint Can, and Tow trucks | 5% |
| 22 | Single, Speed Trap (2 any color) and Tow trucks | 5% |
| 23 | Single, Speed Trap (1 green, 1 red) and Tow trucks | 5% (random choice) |
| 24 | Single, Speed Trap (1 any color) and paint cans | 5% |
| 25 | Double, Speed Trap (1 green, 1 red) and Tow trucks | 5% |
| 26 | Double, Speed Trap (2 any color, 1 blue, 1 red) and Roadside Paint Can | 5% |
| 27 | Double, Roadside Paint Can and Tow truck | 5% (random choice) |
| 28 | Single, Paint truck | 5% |
| 29 | Single, Paint truck | 5% |
| 30 | Single, Paint truck | 5% |
| 31 | Single, Speed traps (2 any color) | NA |
| 32 | Single, Speed traps (2 any color) | NA |
| 33 | Single, Tow truck | 5% |
| 34 | Single, Tow truck | 5% |
| 35 | Single, Tow truck, Paint truck | 10% (random choice) |
| 36 | Double, Tow truck, Paint truck | 10% (random choice) |
| 37 | Single, Tow truck, Speed Trap (2 any color, 1 specific color) | 5% |

TABLE 6-continued

Exemplary Game Element Schedule

| Configuration | Game Elements | Frequency |
| --- | --- | --- |
| 38 | Double, Tow truck, Speed Trap (2 any color) | 5% |
| 39 | Single, Tow truck, Paint truck | 10% (random choice) |
| 40 | Double, Tow truck, Paint truck | 10% (random choice) |
| 41 | Single, Tow truck, Speed Trap (2 any color, 1 specific color) | 5% |
| 42 | Double, Tow truck, Paint truck | 5% |
| 43 | Single, Tow truck, Paint truck | 10% (random choice) |
| 44 | Double, Tow truck, Paint truck | 10% (random choice) |
| 45 | Single, Tow truck, Speed Trap (2 any color, 1 specific color) | 5% |
| 46 | Double, Tow truck, Speed Trap (2 any color) | 5% |
| 47 | Single, Tow truck, Paint truck | 10% (random choice) |
| 48 | Double, Tow truck, Paint truck | 10% (random choice) |
| 49 | Single, Tow truck, Speed Trap (2 any color, 1 specific color) | 5% |
| 50 | Double, Tow truck, Speed Trap (2 any color) | 5% |
| 51 | Single, Tow truck, Paint truck | 10% (random choice) |
| 52 | Double, Tow truck, Paint truck | 10% (random choice) |
| 53 | Single, Tow truck, Speed Trap (2 any color, 1 specific color) | 5% |
| 54 | Double, Tow truck, Paint truck | 5% |
| 55 | Single, Paint truck | 5% |
| 56 | Single, Paint truck | 5% |
| 57 | Single, Paint truck | 5% |
| 58 | Single, Speed traps (2 any color) | NA |
| 59 | Single, Speed traps (2 any color) | NA |
| 60 | Single, Tow truck | 5% |
| 61 | Single, Tow truck | 5% |
| 62 | Single, Tow truck, Paint truck | 10% (random choice) |
| 63 | Double, Tow truck, Paint truck | 10% (random choice) |
| 64 | Single, Tow truck, Speed Trap (2 any color, 1 specific color) | 5% |
| 65 | Double, Tow truck, Speed Trap (2 any color) | 5% |
| 66 | Single, Tow truck, Paint truck | 10% (random choice) |
| 67 | Double, Tow truck, Paint truck | 10% (random choice) |
| 68 | Single, Tow truck, Speed Trap (2 any color, 1 specific color) | 5% |
| 69 | Double, Tow truck, Paint truck | 5% |
| 70 | Single, Tow truck, Paint truck | 10% (random choice) |
| 71 | Double, Tow truck, Paint truck | 10% (random choice) |
| 72 | Single, Tow truck, Speed Trap (2 any color, 1 specific color) | 5% |
| 73 | Double, Tow truck, Speed Trap (2 any color) | 5% |
| 74 | Single, Tow truck, Paint truck | 10% (random choice) |
| 75 | Double, Tow truck, Paint truck | 10% (random choice) |
| 76 | Single, Tow truck, Speed Trap (2 any color, 1 specific color) | 5% |
| 77 | Double, Tow truck, Speed Trap (2 any color) | 5% |
| 78 | Single, Tow truck, Paint truck | 10% (random choice) |
| 79 | Double, Tow truck, Paint truck | 10% (random choice) |
| 80 | Single, Tow truck, Speed Trap (2 any color, 1 specific color) | 5% |
| 81 | Double, Tow truck, Paint truck | 5% |

Points in the game may be awarded according to any scheme desired. One exemplary embodiment of a points scheme is presented in Table 7.

TABLE 7

Point Scheme

| Event | Points Awarded |
|---|---|
| Matched cars | 2 pts per car |
| Loop around car ring | 10 pts per loop |
| Site visited | 40 pts per site |

As may be seen, in this scheme, when cars are matched, 2 points may be awarded per car. 10 points may be awarded each time the participant's car (white car) makes a loop around the car ring, and 40 points may be awarded per site visited, e.g., each time a site such as the Cozy Dog Drive-In, mentioned above, is visited or passed. Of course, in other embodiments, any point scheme may be used as desired.

Figures 12, 13:
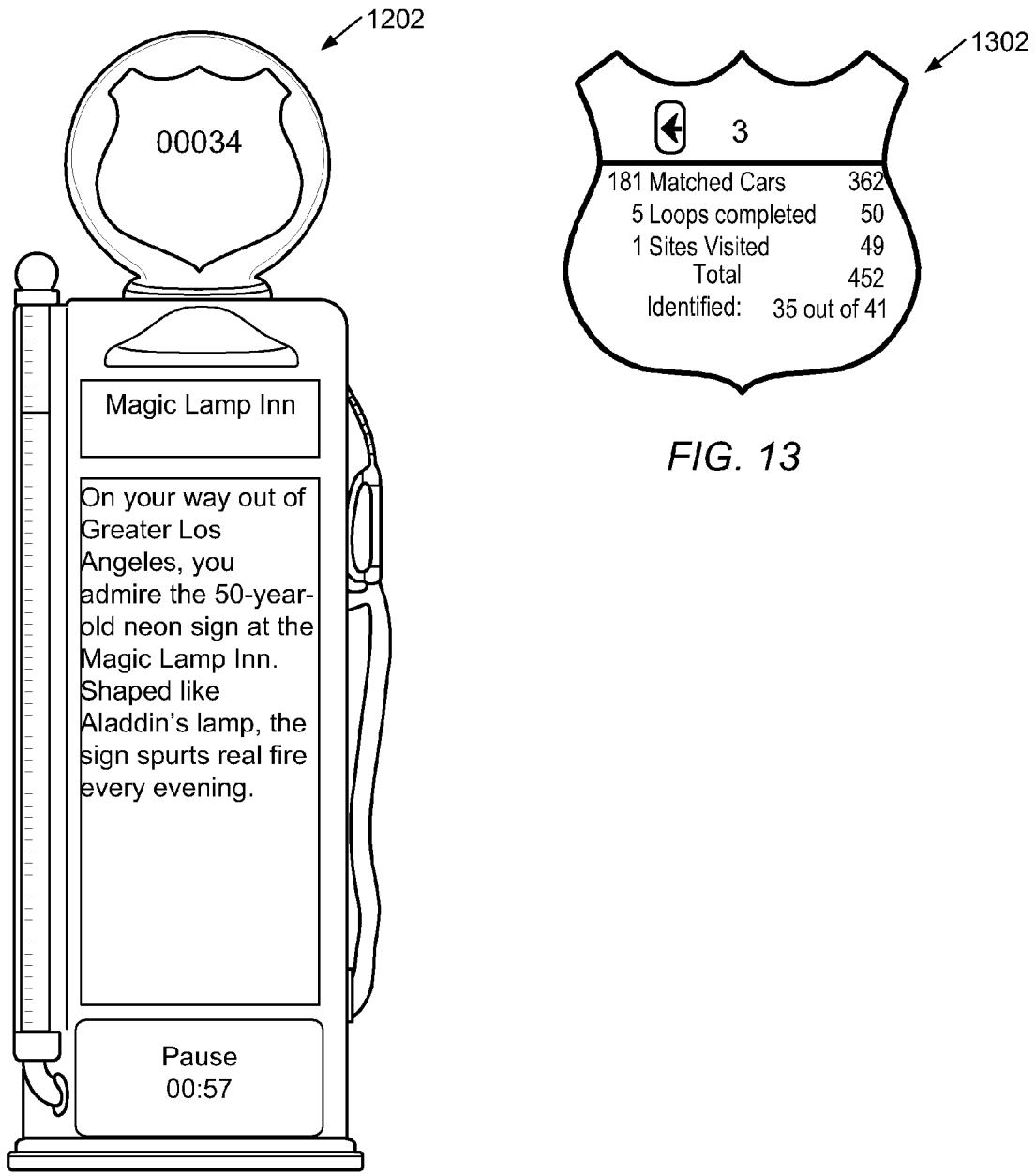
FIG. 12 illustrates an exemplary GUI sidebar, according to one embodiment.
FIG. 13 illustrates an exemplary GUI summary display, according to one embodiment.

As noted above, in some embodiments, the GUI may include a sidebar whereby information regarding the game or progress in the game may be displayed. FIG. 12 illustrates on embodiment of a sidebar layout 1202, where the sidebar is represented as an old gas pump. As may be seen, in this embodiment, sidebar elements and indicators may include, but are not limited to:

1. Score indicator—indicates the current score for the configuration. This may be reset at the end of each configuration. In FIG. 12, the score is displayed at the top of the gas pump.

2. Pause/Timer button—(labeled "Pause") pauses the game and timer.

3. Configuration progress indicator—indicates the participant's progress in the current configuration. May be represented as a gas tank level indicator, as may be seen along the left side of the gas pump of FIG. 12.

4. Route 66 site indicator—indicates site name and short description for route 66 area visited, e.g.: "On your way out of Greater Los Angeles, you admire the 50 year-old neon sign at the Magic Lamp Inn. Shaped like Aladdin's lamp, the sign spurts real fire every evening."

Another example of a site indicator directed to the above-mentioned Cozy Dog Drive-In may be:

"You've reached the Cozy Dog Drive-In, where the modern corndog was invented. Ed Waldmire, original owner of the Cozy Dog, wanted to call his creation the 'crusty cur,' but his wife didn't like the name much. So when he launched them in 1946, he renamed them 'cozy dogs.'"

Configurations Summary Screen

In some embodiments, a summary display may be presented whereby various attributes or information regarding the game may be presented to the participant. For example, as illustrated in FIG. 13, in one exemplary embodiment, the following information may be included on the summary screen:

1. Page Number (configuration number);
2. Points Summary (all items that contributed to points earned in configuration);
3. Number of correct responses out of the total number of trials taken;
4. Map with motel or resort icons to show progress through configurations; and
5. Next button.

Note that in addition to the above points scheme (Table 7), points may be awarded for each correct trial, and for collapsing a group of matching cars, among others.

Threshold Determination and Assessment

As mentioned above, in some embodiments, the repeating of 320 may include assessing the participant's performance a plurality of times during the repeating. As also indicated above, stimulus intensity is an adjustable attribute of a presented stimulus whereby the task or a trial in the task may be made more or less difficult. For example, in one embodiment, the stimulus intensity may be the duration of the stimulus presentation, i.e., the presentation time, although other attributes of the stimulus may be used as desired. The threshold is the value of the stimulus intensity at which the participant achieves a specified level of success, e.g., 0.9, corresponding to a 90% success rate. It should be noted that any other attribute or combination of attributes may be used as desired, the term stimulus intensity being intended to refer to any such adjustable attributes.

Exercise based assessments (i.e., threshold determination) are designed to assess a participant's threshold with respect to stimuli on a given exercise, and can be used to adjust stimulus presentation to (substantially) achieve and maintain a desired success rate for the participant, e.g., with respect to a particular exercise, task, or condition. As will be described below, such threshold determination may also be used to assess or determine a pre-training threshold that can then be used to calibrate the program to an individual's capabilities on various exercises, as well as serve as a baseline measure for assessing the participant's performance periodically during an exercise. Such assessment may also serve as a baseline measure to which post-training thresholds can be compared. Comparison of pre-training to post-training thresholds may be used to determine the gains made as a function of training with the cognition enhancement exercise or tasks described herein.

As noted above, there are various approaches whereby such thresholds may be assessed or determined. In some embodiments, assessing the participant's performance a plurality of times may be performed according to the maximum likelihood procedure, such as, for example, the well known QUEST (Quick Estimation by Sequential Testing) threshold method, which is an adaptive psychometric procedure for use in psychophysical experiments, or a related method, referred to as the ZEST (Zippy Estimation by Sequential Testing) procedure or method, among others, although it should be noted that such methods have not heretofore been utilized in cognition enhancement training exercises using visual stimuli, as described herein.

The ZEST procedure is a maximum-likelihood strategy to estimate a subject's threshold in a psychophysical experiment based on a psychometric function that describes the probability a stimulus is detected as a function of the stimulus intensity. For example, consider a cumulative Gaussian psychometric function, $F(x-T)$, for a 4-alternative-forced-choice (afc) task with a 5% lapsing rate, with proportion correct (ranging from 0-1) plotted against intensity of the stimulus (ranging from 0-5). As used herein, the term intensity (with respect to stimuli) refers to the value of the adaptive dimension variable being presented to the participant at any particular trial in a particular exercise. In other words, the intensity value is that parameter regarding the exercise stimuli that may be adjusted or adapted, e.g., to make a trial more or less difficult. For example, in preferred embodiments of the visual search exercise, the intensity value is the search duration or presentation time (e.g., in milliseconds). The threshold is defined to be the mean of the Gaussian distribution for a specified success rate—e.g., a value yielding some specified success rate, e.g., 60%.

The method may make some assumptions about the psychophysics:

The psychometric function has the same shape, except a shift along the stimulus intensity axis to indicate different threshold value.

The threshold value does not change from trial to trial.

Individual trials are statistically independent.

The primary idea of the ZEST procedure is as follows: given a prior probability density function (P.D.F.) centered around the best threshold guess, x, this P.D.F. is adjusted after each trial by one of two likelihood functions, which are the probability functions that the subject will respond "yes" or "no" to the stimulus at intensity as a function of threshold. Since the psychometric function has a constant shape and is of the form $F(x-T)$, fixing the intensity x and treating threshold T as the independent variable, the "yes" likelihood, $p=F(-(T-x))$, is thus the mirror image of the psychometric function about the threshold, and the "no" likelihood function is then simply $1-p$.

The P.D.F. is updated using Bayes' rule, where the posterior P.D.F. is obtained by multiplying the prior P.D.F. by the likelihood function corresponding to the subject's response to the trial's stimulus intensity. The mean of the updated (or posterior) P.D.F. is then used as the new threshold estimate and the test is repeated with the new estimate until the posterior P.D.F. satisfies a confidence interval criteria (e.g. standard deviation of posterior P.D.F.<predetermined value) or a maximum number of trials is reached.

In one example of the ZEST procedure, a single trial of a 4-afc experiment is performed, with x=2.5 (intensity) as the initial threshold guess. If the subject responds correctly, the next trial is placed at the mean of the corresponding posterior P.D.F., ~x=2.3; if the response is incorrect, the next trial is placed at the mean of the corresponding P.D.F., ~x=2.65.

Thus, in some embodiments, a single stair ZEST procedure such as that described above may be used to adjust the intensity of the stimuli for the visual searches during training. In contrast, in some embodiments, particularly with respect to the periodic assessments during the exercise (as opposed to the "per response" stimulus adjustment), assessing the participant's performance a plurality of times may be performed using a 2-stair maximum likelihood procedure, e.g., a 2-stair ZEST procedure, where two independent tracks with starting values, preferably encompassing the true threshold, each running its own ZEST procedure, are randomly interleaved in the threshold seeking procedure. In addition to their individual termination criterion, the difference between the two stairs may also be required to be within a specified range, e.g., the two stairs may be constrained to be a predetermined distance apart. An exemplary implementation of this approach is described below with respect to the visual search threshold assessment.

As used herein, the parameters required for ZEST may include the mean of the prior P.D.F. (threshold estimate), the standard deviation of the prior P.D.F. (spread of threshold distribution), the standard deviation of the cumulative Gaussian distribution (slope of psychometric function), the maximum number of trials to run, and a confidence level and interval. Additionally, in one embodiment, the trial-by-trial data saved for analysis may include: the track used, the stimulus intensity presented, the subject's response, the mean of posterior P.D.F., and the standard deviation of the posterior P.D.F., as well as any other data deemed necessary or useful in determining and/or assessing the participant's threshold.

Thus, in preferred embodiments, a maximum likelihood procedure, such as a ZEST procedure, may be used to adjust the stimulus intensity of the visual searches during training (e.g., via a single stair ZEST procedure per condition), and may also be used for assessment purposes at periodic stages of the exercise (e.g., via a dual stair ZEST procedure, describe below). In one embodiment, such assessment may occur at specified points during the exercise, e.g., at 0% (i.e., prior to beginning), 25%, 50%, 75%, and 100% (i.e., after completion of the exercise) of the exercise. Thus, for example, in a 40-day exercise schedule, these assessments, which may be referred to as baseline measurements, may be made on days before and after training, and after 10, 20, and 30 days of training, to gauge improvements over the training time.

In another embodiment, the participant may be prompted or instructed to take an assessment on the first training day, and may be offered the opportunity to take an assessment at any other point during the training. For example, the participant may be prompted or advised to take an assessment at certain points during the training when the participant's performance during training reaches a certain level, possibly weighted by the number of training trials that have been performed. In some embodiments, the assessing may be performed at any time during the course of training to track the participant's improvement.

An example of an assessment is now described.

In one embodiment, a primary purpose of the visual search threshold assessment is to determine the smallest duration (i.e., presentation time) of stimulus presentation time in a visual search task that a person can respond correctly to above a statistical threshold, although it should be noted that other attributes may be used as stimulus intensity as desired, duration being but an exemplary stimulus intensity. The visual search assessment may be similar to the above exercise with respect to visual presentation, where the differences between the assessment and the exercise lie (at least primarily) in the movement or progression through the task and the data that are obtained from this movement for the assessment. The procedure is designed to obtain a threshold, which is a statistical rather than an exact quantity. In one embodiment, for the purposes of this exercise, the threshold may be defined as the smallest duration of stimulus presentation time (in milliseconds) for visual search at which the participant will respond correctly a specified percentage, e.g., 69%, 90%, etc., of all trials for the task. In a preferred embodiment, being a computer based task, the visual search assessment may use the ZEST procedure to progress or move through the task, adjust the duration of the stimulus presentation time for the visual searches, and determine the statistical threshold.

As noted above, many aspects of the visual search assessment may generally be similar, or possibly even identical, to the visual search exercise task with respect to visual presentation. However, some aspects of the exercise version of visual search may not be necessary in the visual search assessment. For example, with regard to the GUI, in some embodiments, GUI elements such as score indicator, number missed, etc., may not be necessary, and so may be omitted. Features or assets that may remain the same may include the "ding" and "thump" sounds that play after a participant responds correctly or incorrectly. The assessment stimulus presentation may also be identical to the training version.

The following describes one embodiment of a 2-stair (dual track) approach for determining a psychophysical threshold for a participant, e.g., an aging adult, where the task is directed to divided attention searches, and where the stimulus intensity comprises the stimulus presentation time, also referred to as duration, although it should be noted that any other attribute (or attributes) may be used as the stimulus intensity as desired. Initially, first and second tracks may be initialized with respective durations based on an initial anticipated threshold, where the initial anticipated threshold is an initial estimate or guess of a duration for visual searches corresponding to a specified performance level of the participant, e.g., a stimulus duration at which the participant fails to respond correctly some specified percentage of the time, e.g., 69%. For example, in one embodiment, the first track may be initialized to a first duration that is below the initial anticipated threshold, e.g., preferably just slightly below the initial anticipated threshold, and the second track may be initialized to a second duration that is (e.g., slightly) above the initial anticipated threshold. Thus, the initial durations of the two tracks may straddle the initial anticipated threshold.

The method elements 304-318 of FIG. 3 may be performed, as described above, where the target image and peripheral location indicator, are presented in accordance with the presentation time or duration of a specified one of either the first track or the second track. In other words, one of the tracks may be selected or otherwise determined, and the stimuli for the visual search may be presented with a duration (i.e., presentation time) of or specified by the selected track. Thus, in preferred embodiments, the initial anticipated threshold, the first duration, the second duration, and the (to be determined) threshold each is or includes a respective stimulus duration or presentation time. As also described above, the participant may be required to select or otherwise indicate the target image, and subsequently, a peripheral location (314), and a determination may be made as to whether the participant selected correctly (312 and 316).

The duration of the specified track may then be adjusted or modified, based on the participant's response. For example, the duration of the track may be modified in accordance with a maximum likelihood procedure, such as QUEST or ZEST, as noted above. In one embodiment, for each track, modifying the duration of the specified track based on the participant's response may include increasing the duration if the participant responds incorrectly, and decreasing the duration if the participant responds correctly. Thus, for each assessment trial (in a given track), the duration of the search for that trial may be determined by the performance of the previous trial for that track. In other words, the participant's response to the stimulus determines that track's next stimulus duration via the maximum likelihood method.

Similar to 320 of FIG. 3, the visually presenting, requiring, determining, and modifying or adjusting (of the duration), may be repeated one or more times in an iterative manner, but in this case, the repeating is performed to determine respective final durations for the first track and the second track. For example, in one embodiment, trials in the first track and the second track may be performed in an alternating manner, or, alternatively, trials may be performed in the first track and the second track randomly with equal probability. Thus, over numerous trials, the number of trials performed in each track should be equal, or at least substantially equal. In preferred embodiments, the presenting, requiring, determining, and modifying, may be repeated until the durations of the first track and the second track have converged to values within a specified confidence interval, and where the values are within a specified distance from each other, or, until a specified number of trials have been conducted for each track. In other words, the repetition may continue until either some maximum number of trials has been performed, or until convergence conditions for the tracks have been met, both singly, and together. For example, each track may be required converge to a respective duration value, and the convergent values for the two tracks may be required to be within some distance or interval of each other.

A threshold for the participant may then be determined based on the respective final durations for the first track and the second track, where the threshold is or specifies the stimulus duration or presentation time associated with the specified performance level of the participant. For example, as mentioned above, the determined threshold may specify the duration (i.e., the presentation time) at which the participant responds correctly some specified percentage of the trials, e.g., 69%, although it should be noted that any other percentage may be used as desired. In one embodiment, the threshold for the participant may be determined by averaging the respective final durations for the first track and the second track. Note that the assessment approach described above is applicable to both Task 1 and Task 2 (or any other visual search task).

Figure 17:
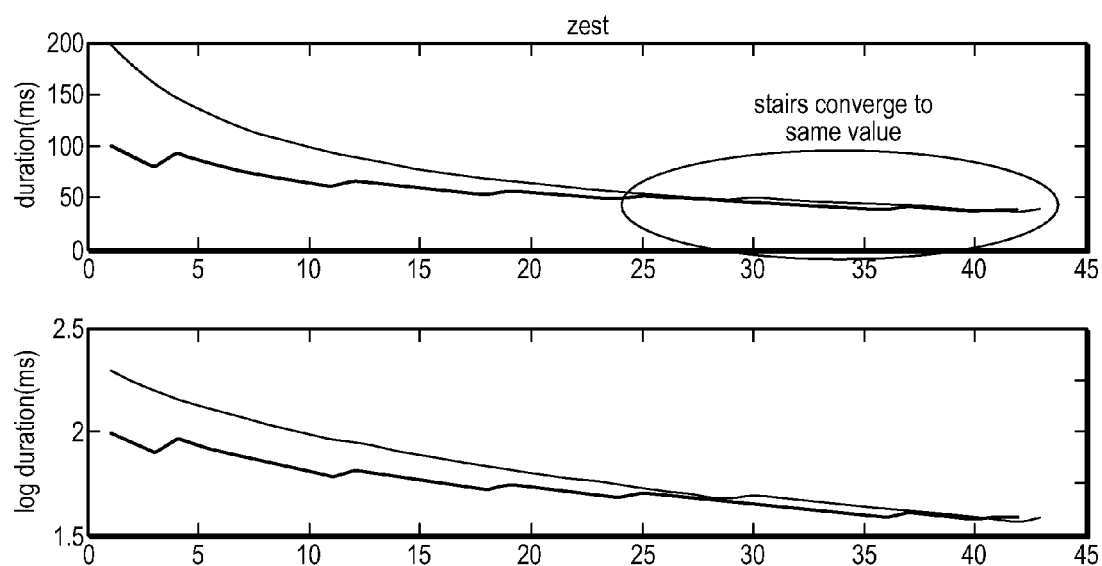
FIG. 17 illustrates convergence to a threshold value over a series of trials in an exemplary two-stair ZEST threshold procedure, according to one embodiment.

FIG. 17 illustrates an exemplary case where two tracks or "stairs" used in a ZEST threshold procedure are shown converging to a threshold value over a series of trials. Note that in the top graph, duration vs. trials is plotted in a linear manner, whereas the bottom graph provides the same information but is logarithmic on the duration (vertical) axis. As may be seen, after about 25 trials, the two tracks or stairs converge to a value at or near 50 ms, thus, the two tracks, initialized respectively to values above and below an initial estimate of the threshold, converge to an approximation of the participant's actual stimulus threshold for the exercise.

In some embodiments, the visually presenting a first target image, visually indicating, visually presenting two or more candidate target images, requiring the participant to select the target image, and determining whether the participant correctly selected the first target image, requiring the participant to select the first peripheral location, determining whether the participant correctly selected the first peripheral location, and adaptively modifying the presentation time, may compose performing a trial, and certain information may be saved on a per trial basis. For example, in one embodiment, for each trial, the method may include saving one or more of: which track was used in the trial, the duration used in the trial, the condition(s) under which the trial was performed, e.g., the number of distracter images presented to the participant in the trial, the eccentricity of the peripheral locations, the visual emphasis level, the participant's selection, the correctness or incorrectness of the participant's response, the mean of a posterior probability distribution function for the maximum likelihood procedure, and the standard deviation of the posterior probability distribution function for the maximum likelihood procedure, among others. Of course, any other data related to the trial may be saved as desired, e.g., the distinguishing attribute of the target image, background attributes, and/or any other condition of the trial.

Additionally, in some embodiments, various parameters for the maximum likelihood procedure besides the respective (initial) durations of the two tracks may be initialized, such as, for example, the standard deviation of a cumulative Gaussian psychometric function for the maximum likelihood procedure, and/or the standard deviation of a prior threshold distribution for the maximum likelihood procedure.

In one embodiment, the method may include determining the initial anticipated threshold. For example, the initial anticipated threshold may be determined based on one or more of: the age of the participant, calibration trials performed by the participant, and/or calibration trials performed by other participants, e.g., in a "pilot" program, although it should be noted that any other type of information may be used as desired to determine the initial anticipated threshold.

In some embodiments, the method may also include performing a plurality of practice trials, i.e., prior to performing the method elements described above. For example, in some embodiments, one or more practice sessions may be performed prior to the beginning of training to familiarize the participant with the nature and mechanisms of each task. For example, in one embodiment, before training begins for each of the single attention and dual attention tasks, the participant may perform at least one practice single attention visual search session and at least one practice dual attention visual search session. In each practice session, a specified number of trials (e.g., 5) for each of one or more practice conditions may be performed. In other words, the method may include performing trials in one or more practice sessions for each of one or more conditions. In some embodiments, the participant may be able to invoke such practice sessions at will during the exercise, e.g., to re-familiarize the participant with the task at hand.

In some embodiments, the participant may be required to show an understanding of the task by achieving a specified level of performance, referred to as a criterion level, on the initial assessment before moving on to the training exercise.

Those skilled in the art should appreciate that they can readily use the disclosed conception and specific embodiments as a basis for designing or modifying other structures for carrying out the same purposes of the present invention without departing from the spirit and scope of the invention as defined by the appended claims. For example, various embodiments of the methods disclosed herein may be implemented by program instructions stored on a memory medium, or a plurality of memory media.

We claim:

1. A method for enhancing cognition in a participant, utilizing a computing device to present visual stimuli for training, and to record responses from the participant, the method comprising the computer implemented steps of:
    providing a set of target images, wherein the target images are available for visual presentation to the participant;
    visually presenting a first target image of the set of target images at a first location in a visual field to the participant, wherein the visual field comprises a plurality of peripheral locations, each located at least a specified distance from the first location;
    visually indicating a first peripheral location of the plurality of peripheral locations in the visual field to the participant, wherein said visually presenting the first target image and said visually indicating the first peripheral location are performed substantially simultaneously and for a specified presentation time, wherein at the end of the specified presentation time said visually presenting the first target image and said visually indicating the first peripheral location are ceased;
    visually presenting two or more candidate target images to the participant, including the first target image and at least one other target image of the set of target images, wherein the two or more candidate target images have a specified discriminability comprising a degree to which the candidate target images visually differ;
    requiring the participant to select the target image from among the candidate target images;
    determining whether the participant correctly selected the first target image;
    if the participant correctly selected the first target image, requiring the participant to select the first peripheral location from among the plurality of peripheral locations in the visual field; and
        determining whether the participant correctly selected the first peripheral location;
    adaptively modifying the presentation time based on the participant's selections;
    repeating said visually presenting a first target image, said visually indicating, said visually presenting two or more candidate target images, said requiring the participant to select the target image, and said determining whether the participant correctly selected the first target image, said requiring the participant to select the first peripheral location, said determining whether the participant correctly selected the first peripheral location, and said adaptively modifying the presentation time, one or more times in an iterative manner to improve the participant's cognition.

2. The method of claim 1, wherein said adaptively modifying the presentation time is performed using a maximum likelihood procedure.

3. The method as recited in claim 2, wherein the maximum likelihood procedure comprises one or more of:
    a QUEST (quick estimation by sequential testing) threshold procedure; or
    a ZEST (zippy estimation by sequential testing) threshold procedure.

4. The method of claim 3, wherein said adaptively modifying the presentation time comprises:
    if the participant correctly selected the target image, shortening the presentation time.

5. The method of claim 3, wherein said adjusting the presentation time comprises:
    if the participant incorrectly selected the target image, lengthening the presentation time.

6. The method of claim 3, wherein said adjusting the presentation time comprises:
    adjusting the presentation time to approach and substantially maintain a specified success rate for the participant.

7. The method of claim 6, wherein said adjusting the presentation time to approach and substantially maintain the specified success rate for the participant is performed for each of a plurality of conditions.

8. The method of claim 6, wherein said adjusting the presentation time to approach and substantially maintain the specified success rate for the participant uses a single stair maximum likelihood procedure.

9. The method of claim 1, wherein said visually presenting, said requiring the participant to select the target image, and said determining whether the participant correctly selected the first target image, said requiring the participant to select the first peripheral location, and said determining whether the participant correctly selected the first peripheral location composes performing a trial, wherein said repeating comprises:
    performing a plurality of trials under each of a plurality of conditions, wherein each condition specifies one or more attributes of the trials.

10. The method of claim 9, further comprising:
    providing one or more peripheral target images, wherein the peripheral target images are available for visual presentation to the participant;
    wherein said visually indicating the first peripheral location comprises visually presenting a peripheral target image at the first peripheral location.

11. The method of claim 10, further comprising:
    providing one or more backgrounds, wherein the one or more backgrounds are available for visual presentation to the participant;

wherein said visually indicating the first peripheral location comprises visually presenting the peripheral target image at the first peripheral location; and wherein the visual field comprises a first background of the one or more backgrounds, and wherein each background has a specified distinguishability comprising the degree to which the peripheral target images are distinguishable from the background.

12. The method of claim 11, further comprising:
providing one or more distracter images, wherein the distracter images are available for visual presentation to the participant;

wherein said visually presenting the peripheral target image further comprises visually presenting at least one distracter image, and wherein the at least one distracter image has a specified discriminability with respect to the peripheral target image.

13. The method of claim 12, wherein each of the conditions specifies one or more of:
colors, textures, shapes, sizes, object types, number, and/or orientations of objects, of the candidate target images;
colors, textures, shapes, sizes, object types, number, and/or orientations of objects of the distracter images;
colors, textures, shapes, and/sizes, object types, number, and/or orientations of objects of the peripheral target images;
discriminability of candidate target images, distracter images, and/or peripheral target images;
eccentricity of the peripheral target image and/or distracter images;
background;
distinguishability of presented images and backgrounds; or
complexity of presented images and/or backgrounds.

14. The method of claim 12, wherein the visual field is partitioned into a plurality of graphically indicated regions, and wherein the plurality of peripheral locations comprise specified regions of the plurality of regions in the visual field.

15. The method of claim 11, further comprising: requiring the participant to identify the peripheral target image.

16. The method of claim 11, wherein said repeating comprises:
after each trial, receiving user input invoking initiation of a next trial.

17. The method of claim 1, wherein said visually presenting the first target image and said visually indicating the first peripheral location are ceased by one or more of:
removing the first target image and the indication of the first peripheral location from the visual field; or
masking the first target image and the indication of the first peripheral location in the visual field.

18. The method of claim 1, wherein said repeating comprises:
assessing the participant's performance a plurality of times during said repeating.

19. The method of claim 18, wherein said assessing the participant's performance a plurality of times is performed according to a maximum likelihood procedure.

20. The method of claim 19, wherein said assessing the participant's performance a plurality of times is performed using a 2-stair maximum likelihood procedure.

21. The method of claim 18, wherein said assessing is performed at any time during the course of training to track the participant's improvement.

22. The method of claim 1, further comprising:
performing trials in one or more practice sessions for each of one or more conditions.

23. The method of claim 1, further comprising:
indicating whether the participant selected the target image correctly, wherein said indicating is performed audibly and/or graphically.

24. The method of claim 1, further comprising:
indicating whether the participant selected the first peripheral location correctly, wherein said indicating is performed audibly and/or graphically.

25. The method of claim 1, wherein said repeating occurs a number of times each day, for a number of days.

26. A non-transitory computer-readable memory medium that stores program instructions for enhancing cognition in a participant, utilizing a computing device to present visual stimuli for training, and to record responses from the participant, wherein the program instructions are executable by a processor to perform:
providing a set of target images, wherein the target images are available for visual presentation to the participant;
visually presenting a first target image of the set of target images at a first location in a visual field to the participant, wherein the visual field comprises a plurality of peripheral locations, each located at least a specified distance from the first location;
visually indicating a first peripheral location of the plurality of peripheral locations in the visual field to the participant, wherein said visually presenting the first target image and said visually indicating the first peripheral location are performed substantially simultaneously and for a specified presentation time, wherein at the end of the specified presentation time said visually presenting the first target image and said visually indicating the first peripheral location are ceased;
visually presenting two or more candidate target images to the participant, including the first target image and at least one other target image of the set of target images, wherein the two or more candidate target images have a specified discriminability comprising a degree to which the candidate target images visually differ;
requiring the participant to select the target image from among the candidate target images;
determining whether the participant correctly selected the first target image;
if the participant correctly selected the first target image,
requiring the participant to select the first peripheral location from among the plurality of peripheral locations in the visual field; and
determining whether the participant correctly selected the first peripheral location;
adaptively modifying the presentation time based on the participant's selections;
repeating said visually presenting a first target image, said visually indicating, said visually presenting two or more candidate target images, said requiring the participant to select the target image, and said determining whether the participant correctly selected the first target image, said requiring the participant to select the first peripheral location, said determining whether the participant correctly selected the first peripheral location, and said adaptively modifying the presentation time, one or more times in an iterative manner to improve the participant's cognition.

* * * * *